(12) United States Patent
Arikawa et al.

(10) Patent No.: US 6,385,139 B1
(45) Date of Patent: May 7, 2002

(54) DISPLAY DEVICE AND ELECTRONIC TIMEPIECE

(75) Inventors: Yasuo Arikawa, Chino; Tsuyoshi Matsui, Matsumoto, both of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/623,626

(22) PCT Filed: Jan. 13, 2000

(86) PCT No.: PCT/JP00/00138

§ 371 Date: Sep. 6, 2000

§ 102(e) Date: Sep. 6, 2000

(87) PCT Pub. No.: WO00/42467

PCT Pub. Date: Jul. 20, 2000

(51) Int. Cl.⁷ .................. G04C 17/00; G04C 19/00; G02F 1/1335; G02B 27/28; G02B 5/30
(52) U.S. Cl. .................. 368/239; 349/96; 349/104; 349/113; 359/487; 359/502
(58) Field of Search ............... 368/82–84, 239–242; 349/61, 64, 68, 69, 80, 96, 97, 104, 113; 359/483, 487, 488, 497, 502

(56) References Cited

U.S. PATENT DOCUMENTS 6,025,897 A * 2/2000 Weber et al. .............. 349/96
6,096,375 A * 8/2000 Ouderkirk et al. ........ 359/485
6,129,971 A * 9/2000 Ouderkirk et al. ........ 349/62

FOREIGN PATENT DOCUMENTS

| EP | 862076 A1 | 9/1998 |
| EP | 0-884-622 A2 | 12/1998 |
| EP | 0-942-313 A1 | 9/1999 |
| WO | WO 95/17692 | 6/1995 |
| WO | WO 95/17699 | 6/1995 |

* cited by examiner

Primary Examiner—Vit Miska
(74) Attorney, Agent, or Firm—Oliff & Berridge, PLC

(57) ABSTRACT

A display device is provided which is able to effect high visibility display utilizing external light, and which is able to effect reflective display with a combination of various textures and color. The display device includes a first polarized-light separating member for transmitting a linearly polarized light component polarized in a first direction, a transmitted light polarization axis changing device capable of selecting states of changing and not changing a transmitted light polarization axis, a second polarized-light separating member for transmitting a linearly polarized light component in a polarized second direction and for mirror-reflecting a linearly polarized light perpendicular to the linearly polarized light component, and a reflecting element disposed in that order. Coloring layers or light-diffusing layers are formed on the surface or the back of the second polarized-light separating member.

19 Claims, 16 Drawing Sheets

DISPLAY DEVICE AND ELECTRONIC TIMEPIECE

BACKGROUND OF THE INVENTION

1. Field of the Invention

The present invention relates to display devices for displaying characters, numerals, patterns and so forth. In addition, the present invention relates to electronic timepieces, such as wristwatches, stopwatches and so forth using the display devices. More specifically, the present invention relates to a display technology such as a liquid crystal device for displaying information by selecting one of the states of changing and not changing of a transmitted light polarization axis of a trasmitted linearly polarized light component.

2. Description of the Related Art

As a device for effecting display using external light, a digital-display-type timepiece using a liquid crystal device is most common. As such an electronic timepiece, one is conventionally known in which a first polarizer, a trasmitted light polarization axis changing optical element (transmitted light polarization axis changing means), such as a liquid crystal device, capable of selecting one of the states of changing and not changing a transmitted light polarization axis of a transmitted linearly polarized light component, a second polarizer, and a reflector plate are deposited in that order. In the liquid crystal device, for example, a TN (Twisted Nematic) liquid crystal, an STN (Super-Twisted Nematic) liquid crystal, an ECB (Electrically Controlled Birefringence) liquid crystal, or the like is used.

SUMMARY OF THE INVENTION

In the thus-constructed electronic timepiece (display device), both of the first and second polarizers transmit a linearly polarized light component in the direction of the transmitted light polarization axis of incident light, while they absorb a linearly polarized light component in the direction of an absorption axis intersecting perpendicularly to the direction of the transmitted light polarization axis. Accordingly, when the external light enters into the first polarizer and only the linearly polarized light component of the transmitted light polarization axis in a first direction enters into the transmitted light polarization axis changing optical element, one of the linearly polarized light component passing through an area for changing the transmitted light polarization axis, and the linearly polarized light component passing through an area for not changing the transmitted light polarization axis is absorbed by the second polarizer, and the other linearly polarized light component is transmitted by the second polarizer to reach the reflector plate. Therefore, only the light reflected by the reflector plate, that is, only the light passing through one of areas in the area for changing the transmitted light polarization axis and the area for not changing the transmitted light polarization axis of the transmitted light polarization axis changing optical element is transmitted by the transmitted light polarization axis changing optical element and the first polarizer, so that the time can be visually recognized.

In this way, according to the conventional electronic timepiece, only the light transmitted by one of the area for changing the transmitted light polarization axis, and the area for not changing the transmitted light polarization axis in the transmitted light polarization axis changing optical element is reflected by the reflector plate, and is transmitted by the transmitted light polarization axis changing optical element and the polarizer to contribute to display. In contrast, the light transmitted by the other area is absorbed by the second polarizer, or is transmitted by a polarization beam separation element, and does not contribute to display. Accordingly, the conventional electronic timepiece has a problem in that a segment portion or a background portion of the display is dark. In addition, for the same reason, the conventional electronic timepiece has a problem in that it is mechanically difficult to improve the esthetic design function of the electronic timepiece, such that it is difficult to make both the segment portion and the background portion mirrored, satined, or colored.

In view of the foregoing problems, an object of the present invention is to realize a display device which is constructed so that even a linearly polarized light component transmitted by any one of the area for changing a transmitted light polarization axis, and the area for not changing the transmitted light polarization axis is emitted toward a user, thereby effecting high visibility display utilizing external light, and which can effect reflective display with a combination of various textures and color tones, and to realize an electronic timepiece using the same.

In order to solve the above problems, in an exemplar of embodiment the invention, as shown in FIG. 1, firstly, a first characteristic of a display device 10 is that a first polarized-light separating member 2 for transmitting a linearly polarized light component polarized in a first direction of incident light and for not transmitting a linearly polarized light component perpendicularly intersecting the linearly polarized light component, a transmitted light polarization axis changing device 3 capable of selecting one of a first state of changing and a second state of not changing a transmitted light polarization axis when the incident linearly polarized light component is transmitted, a second polarized-light separating member 4 for transmitting a linearly polarized light component in a second direction of incident linearly polarized light components and reflecting a linearly polarized light component in a third direction perpendicularly intersecting the second direction, and a reflecting element 5 capable of reflecting the linearly polarized light component transmitted by the second polarized-light beam separating member 4 toward the second polarized-light separating member 4 are disposed in that order. In addition, according to the present invention, a second characteristic is that a modified layer (for example, a back-side coloring layer 71, a surface-side coloring layer 72, a back-side light-diffusing layer 91, and a surface-side light-diffusing layer 92) for emitting light incident on the second polarized-light separating member 4 by changing optical characteristics is formed on at least one of a surface 41 facing the transmitted light polarization axis changing device 3 of the second polarized-light separating member 4 and a back 42 facing the reflecting element 5.

In the thus-constructed display device 10, predetermined information can be displayed by first return light reflected by the reflecting element 5 to be transmitted by the second polarized-light separating member 4, the transmitted light polarization axis changing means 3, and the first polarized-light separating member 2, and second return light reflected by the second polarized-light separating member 4 to be transmitted by the transmitted light polarization axis changing device 3 and the first polarized-light separating member 2 in the light incident on the first polarized-light separating member 2 from the opposite side of the transmitted light polarization axis changing device 3.

That is, according to the present invention, each light transmitted by an area in the first state of changing the transmitted light polarization axis and transmitted by an area in the second state of not changing the transmitted light polarization axis in the transmitted light polarization changing device 3 is emitted as a linearly polarized light component (first return light) reflected by the reflecting element 5 to be transmitted by the second polarized-light separating member 4, the transmitted light polarization axis changing device 3, and the first polarized-light separating member 2, and as a linearly polarized light component (second return light) reflected by the second polarized-light separating member 4 to be transmitted by the transmitted light polarization axis hanging device 3 and the first polarized-light separating member 2, and contribute to display. Accordingly, for example, in an electronic timepiece or the like, since both a background portion and a segment portion can be brightly displayed with good contrast, there is an advantage of good visibility.

In addition, according to the present invention, the modified layer (for example, the back-side coloring layer 71, the surface-side coloring layer 72, the back-side light-diffusing layer 91, and the surface-side light-diffusing layer 92) for emitting light incident on the second polarized-light separating member 4 by changing optical characteristics is formed on at least one of the surface 41 facing the transmitted light-polarization axis changing device 3 of the second polarized-light separating member 4 and the back 42 facing the reflecting element 5, so that the modified layer imparts a hue or diffusibility to one or both of the first and second return light. Therefore, various combinations of texture and color can be realized, such that areas displayed by the first and second return light, for example, both the background portion and the segment portion of the electronic timepiece, can be colored, and highly versatile combinations of display forms are possible. For example, a form in which both the background portion and the segment portion are displayed in a colored mirror form, a form in which both the background portion and the segment portion are displayed in an orange peel form, a form in which one of the background portion and the segment portion is displayed in a colored mirror form and other one is displayed in an orange peel form, and so forth can be put into practice, so that an impression of high quality and the pleasure of displaying are increased. Moreover, since the modified layer is formed on the second polarized-light separating member 4, the number of parts is not increased.

In another exemplary embodiment of the of the modified layer is a surface-side modified layer (for example, a surface-side coloring layer 72, and a surface-side light-diffusing layer 92) formed on the surface of the second polarized-light separating member.

In another exemplary embodiment of the invention, the modified layer is a back-side modified layer (for example, a back-side coloring layer 71, and a back-side light-diffusing layer 91) formed on the back of the second polarized-light separating member.

In another exemplary embodiment of the invention, the modified layer includes at least a coloring layer (the back-side coloring layer 71, and the surface-side coloring layer 72) for emitting light incident on the second polarized-light separating member by changing a hue.

In another embodiment the invention, the modified layer includes at least a light-diffusing layer (the back-side light-diffusing layer 91 and the surface-side light-diffusing layer 92) for diffusing and emitting light incident on the second polarized-light separating member.

In another embodiment the invention, the modified layer is a composite layer including a coloring layer (the back-side coloring layer 71 and the surface-side coloring layer 72) for emitting light incident on the second polarized-light separating member by changing a hue and a light-diffusing layer (the back-side light-diffusing layer 91 and the surface-side light-diffusing layer 92) for diffusing and emitting light incident on the second polarized-light separating member.

In another embodiment of the invention, the modified layer is formed as a surface-side modified layer (for example, the surface-side coloring layer 72 and the surface-side light-diffusing layer 92) and as a back-side modified layer (for example, the back-side coloring layer 71 and the back-side light-diffusing layer 91) on both the surface and the back of the second polarized-light separating member, and the surface-side modified layer and the back-side modified layer mutually emit light incident on the second polarized-light separating member by changing optical characteristics into different types. With this configuration, a hue or diffusibility is imparted by both the surface-side modified layer and the back-side modified layer to the linearly polarized light component (first return light) reflected by the reflecting element 5 to be transmitted by the second polarized-light separating member 4, the transmitted light polarization axis changing device 3, and the first polarized-light separating member 2, whereas a hue or diffusibility is imparted only by the surface-side modified layer to the linearly polarized light component (second return light) reflected by the second polarized-light separating member 4 to be transmitted by the transmitted light polarization axis changing device 3 and the first polarized-light separating member 2. Therefore, highly versatile combinations of display forms are possible.

In another embodiment of the invention, each of the surface-side modified layer and the back-side modified layer includes at least a surface-side coloring layer 72 and a back-side coloring layer 71 for emitting light incident on the second polarized-light separating member by changing a hue into hues which differ from each other.

In another embodiment of the invention, each of the surface-side modified layer and the back-side modified layer includes at least a surface-side light-diffusing layer 92 and a back-side light-diffusing layer 91 for emitting light incident on the second polarized-light separating member by changing the light into diffusion patterns which differ from each other.

In another embodiment of the invention, at least one of the surface-side modified layer and the back-side modified layer is a composite layer including a coloring layer (the back-side coloring layer 71 and the surface-side coloring layer 72) for emitting light incident on the second polarized-light separating member by changing a hue, and a light-diffusing layer (the back-side light-diffusing layer 91 and the surface-side light-diffusing layer 92) for diffusing and emitting light incident on the second polarized-light separating member In another embodiment of the invention, the surface-side modified layer is formed on an entire surface 41 of the second polarized-light separating member 4.

In another embodiment of the invention, the surface-side modified layer is formed only on a predetermined area in the surface 41 of the second polarized-light separating member 4. With this configuration, a hue or diffusibility is imparted by the surface-side modified layer to the light transmitted by an area where the surface-side modified layer is formed, regardless of whether the light is trasmitted by an area in the transmitted light polarization axis changing device 3 for changing a transmitted light polarization axis or by an area for not changing the transmitted light polarization axis.

Therefore, if the surface-side modified layer is formed on the surface of the second polarized-light separating member as a pattern or a mark, the pattern or the mark to which a hue or diffusibility is imparted by the surface-side modified layer can be superimposed on the display formed by the first return light and the second return light. Therefore, the versatility of combinations of display forms becomes higher.

In another embodiment of the invention, wherein the back-side modified layer is formed on an entire back 42 of the second polarized-light separating member.

In another embodiment of the invention, wherein the back-side modified layer is formed on a predetermined area in the back 42 of the second polarized-light separating member 4. With this configuration, a hue or diffusibility is imparted by the back-side modified layer to the light transmitted by an area where the back-side modified layer is formed in the linearly polarized light component reflected by the reflecting element 5 to be transmitted by the second polarized-light separating member 4, the transmitted light polarization axis changing device 3, and the first polarized-light separating member 2. Therefore, if the back-side modified layer is formed on the back of the second polarized-light separating member as a pattern or a mark, the pattern or the mark to which a hue or diffusibility is imparted by the back-side modified layer can be superimposed on the display formed by the first return light. Therefore, the versatility of combinations of display forms becomes higher.

In another embodiment of the invention, the reflecting means is a partial reflection optical element for reflecting a part of an incident linearly polarized light component and transmitting other light, and includes a light source for a backlight capable of emitting light toward the reflecting means disposed between the second polarized-light separating member and the reflecting means at a position for sandwiching the reflecting means, and the display device is constructed so as to display predetermined information using a linearly polarized light component emitted from the light source for backlight and transmitted by the second polarized-light separating member, the transmitted light polarization axis changing means, and the first polarized-light separating member.

In another embodiment of the invention, the coloring layer is either a color filter layer or a dyeing layer attached to the second polarized-light separating member.

In another embodiment of the invention, the light-diffusing layer is either a corrugation formed on the second polarized-light separating member or a light-scattering coating film attached to the second polarized beam separation member.

In another of the invention, the transmitted light polarization axis changing device includes a liquid crystal device In another embodiment the invention an electronic timepiece is constructed using the display device defined in any one the above exemplary embodiments.

That is, according to the present invention, the time and measurement results of time are displayed in digital form or in analog form by an area in the transmitted light polarization axis changing means selected in a state of transmitting by changing the transmitted light polarization axis of the linearly polarized light transmitted by the first polarized-light separating member and by an area selected in a state of transmitting with no change.

DETAILED DESCRIPTION OF THE EMBODIMENT

Embodiments to which the present invention is applied will now be described with reference to the drawings.
[Schematic Structure of Electronic Timepiece]

Figure 2:
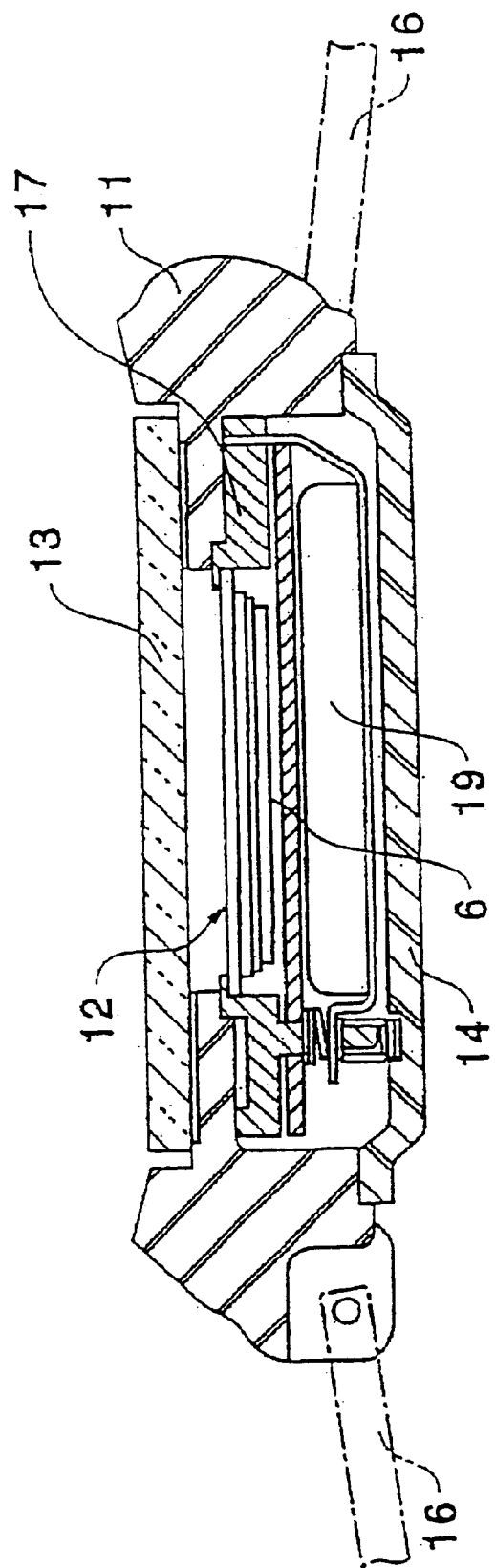
FIG. 2 is a sectional view showing an example of an electronic timepiece equipped with the display device according to the present invention.
Figure 3:
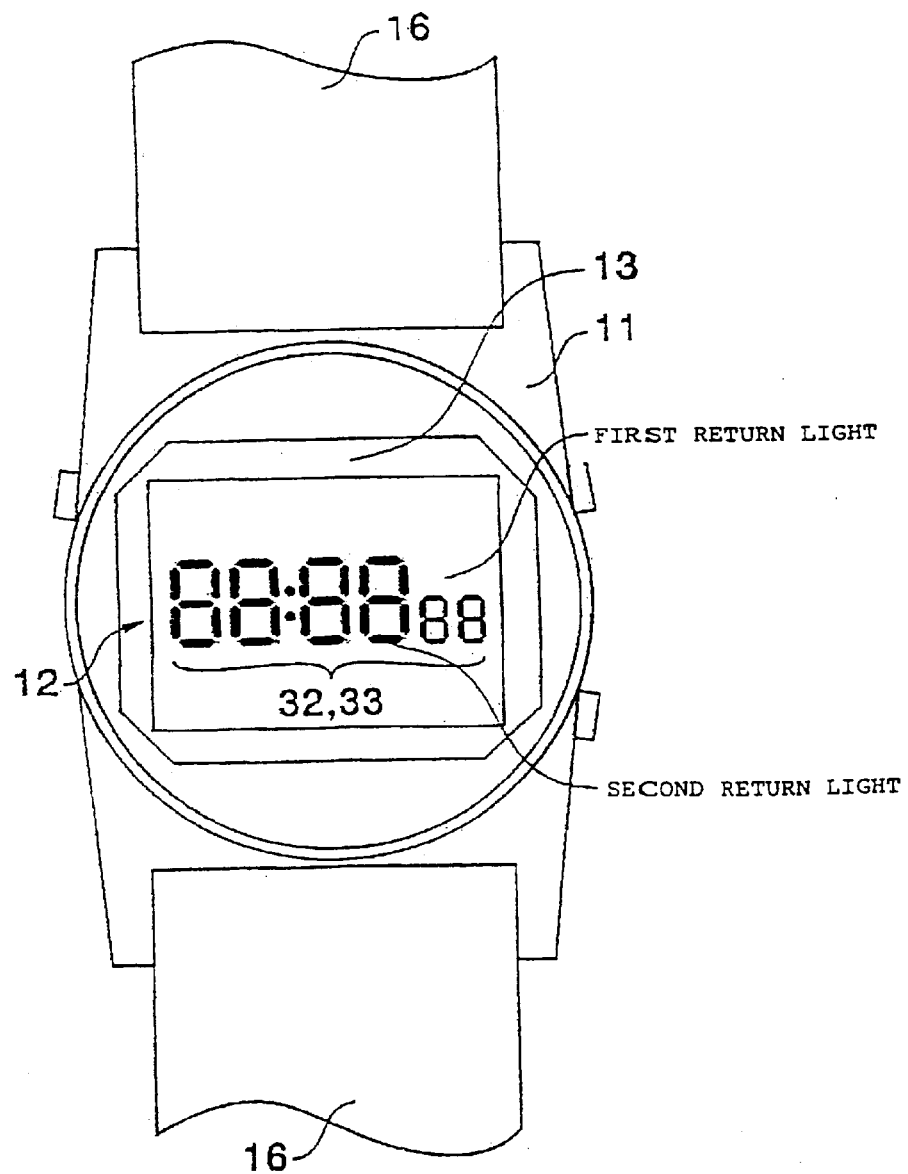
FIG. 3 is a plan view of the electronic timepiece shown in FIG. 2.
Figure 4:
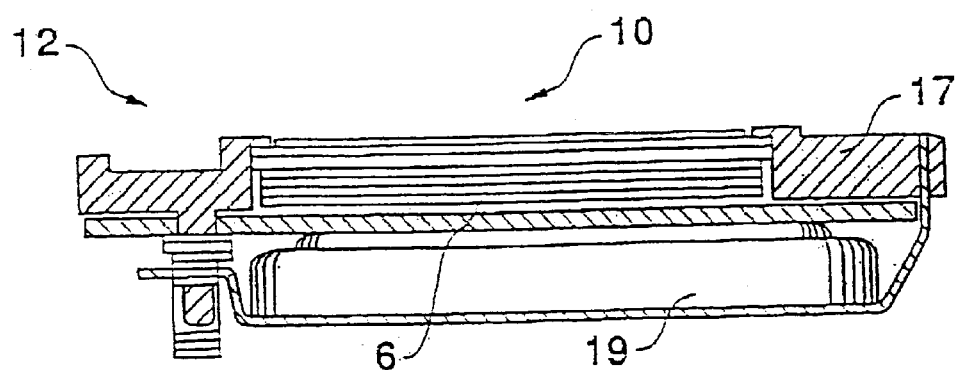
FIG. 4 is a sectional view showing a movement contained in the electronic timepiece shown in FIG. 2.

FIGS. 2 to 4 are a sectional view and a plan view of an electronic timepiece which is an embodiment of an electronic timepiece according to the present invention, and a sectional view of a movement 12, respectively.

Referring to FIGS. 2 to 4, this electronic timepiece is composed of, for example, a plastic casing 11, a movement 12 housed inside the casing, a glass plate 13 fixed to the casing 11 and located on the movement 12, and a back cover 14 for fixing the movement 12. The movement 12 is, as shown in FIG. 4, formed with a display device 10 which will be described in the following embodiments, and a light source 6 for a backlight is disposed according to demand. In addition, a battery 19 is disposed as shown in FIG. 2. The movement 12 is supported by its own frame body 17.

While the display device 10 is constructed so as to display the time in digital form in the example shown in FIG. 3, the display device 10 may be constructed so as to display the time in analog form by a display pattern corresponding to hands.

[Description of Members used in Display Device 10]

Before describing the embodiments, members used in the present invention will be described with reference to FIG. 1.

Figure 1:
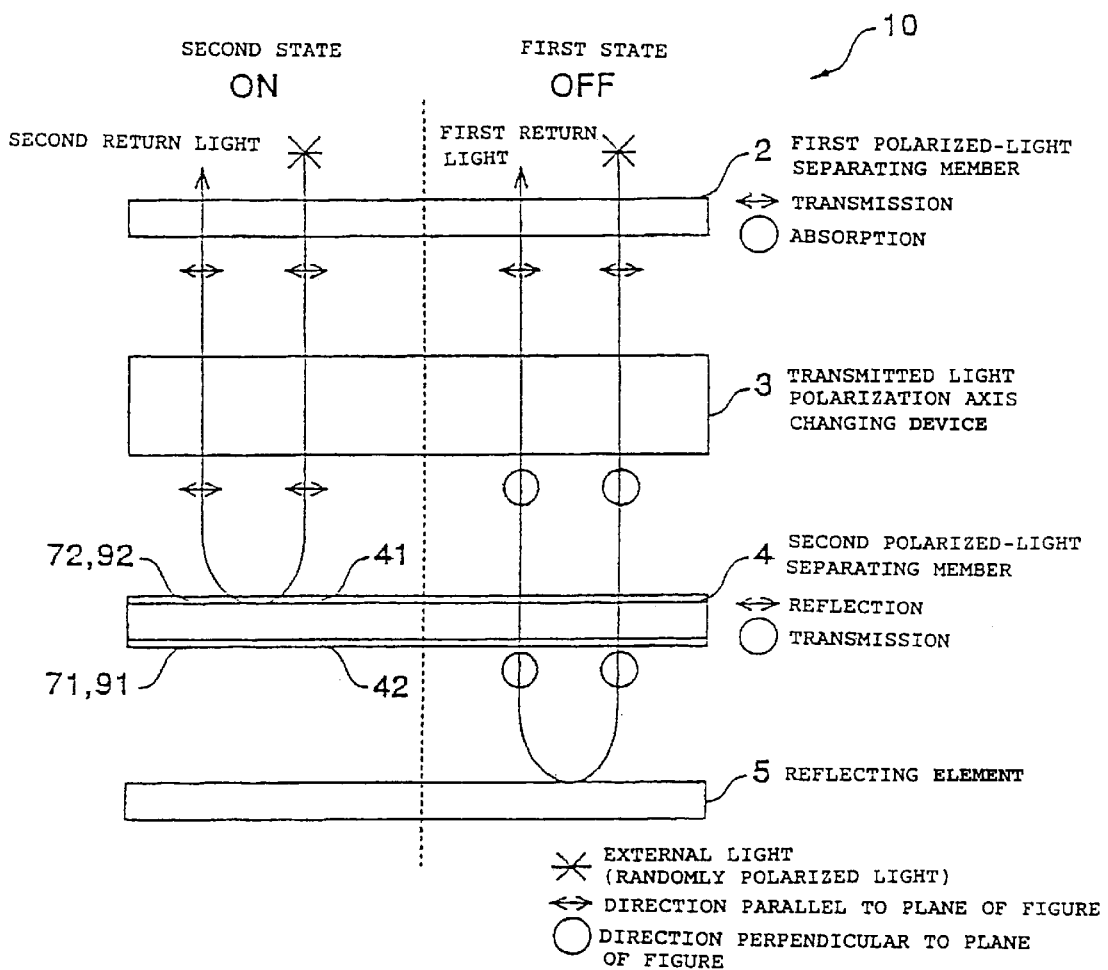
FIG. 1 is a schematic structural view showing a basic configuration of a display device according to the present invention

As shown in FIG. 1, a first characteristic of the display device 10 to which the present invention is applied is that a first polarized-light separating member 2 for transmitting a linearly polarized light component pointing in a first direction of incident light and not for transmitting a linearly polarized light component perpendicularly intersecting the linearly polarized light component, a transmitted light polarization axis changing device 3 capable of selecting one of a first state of changing and a second state of not changing a transmitted light polarization axis when the incident linearly polarized light component is transmitted, a second polarized-light separating member 4 for transmitting a linearly polarized light component in a second direction of incident linearly polarized light components and reflecting a linearly polarized light component in a third direction perpendicularly intersecting the second direction, and a reflecting element 5 capable of reflecting the linearly polarized light component transmitted by the second polarized-light beam separating member 4 toward the second polarized-light separating member 4, are disposed in that order. Also, a second characteristic of the display device 10 to which the present invention is applied is that a modified layer (for example, a back-side coloring layer 71, a surface-side coloring layer 72, a back-side light-diffusing layer 91, and a surface-side light-diffusing layer 92) for emitting light incident on the second polarized-light separating member 4 by changing optical characteristics is formed on at least one of a surface 41 facing the transmitted light polarization axis changing device 3 of the second polarized-light separating member 4 and a back 42 facing the reflecting element 5.

A known polarizer can be used as the first polarized-light separating member 2. According to this polarizer, when natural light enters, a linearly polarized light component in a predetermined direction (for example, the direction parallel to the plane of the figure/first direction) is transmitted, whereas, when a linearly polarized light component in the direction perpendicular to the plane of the figure intersecting perpendicularly to the above linearly polarized light component enters, it is absorbed and is not transmitted.

A known liquid crystal panel (liquid crystal device) can be used as the transmitted light polarization axis changing element 3. While it is not shown in the figure, the liquid crystal panel has a pair of transparent glass substrates opposing each other, and liquid crystal, such as TN liquid crystal, is sealed in a gap formed between the glass substrates, a so-called cell gap. Each of the glass substrates is, for example, as shown in FIG. 3, formed with a plurality of segment electrodes (transparent electrodes) for displaying information, such as numerals or characters, so that they oppose each other between the substrates. In the liquid crystal panel shown in FIG. 3, a transparent electrode divided into seven segments is used as a transparent electrode for displaying a one-digit numeric character. A predetermined voltage can be applied between the pair of segment electrodes opposing each other, and according to whether the voltage is applied (ON) or the voltage is not applied (OFF), the alignment of the liquid crystal can be set to one of two states. As a result, in this embodiment, the liquid crystal is set so that the transmitted light polarization axis of the linearly polarized light passing through the liquid crystal is twisted only 90° (first state) when the segment electrodes are in the OFF state. In contrast, the liquid crystal transmits the linearly polarized light passing therethrough without changing the transmitted light polarization axis thereof (second state) when the segment electrodes are in the ON state.

As the second polarized-light separating member 4, a polarized-light separation film disclosed in the International Application of the International Publication No. WO95/17692 or WO95/27919 can be used. This polarized-light separation film is constructed so that linearly polarized light in one direction is transmitted, and other linearly polarized light is not absorbed or the like, but is mirror-reflected. In addition, according to this polarized-light separation film, all of the linearly polarized light in the direction perpendicular to the transmitted light polarization axis is mirror-reflected.

Figure 5:
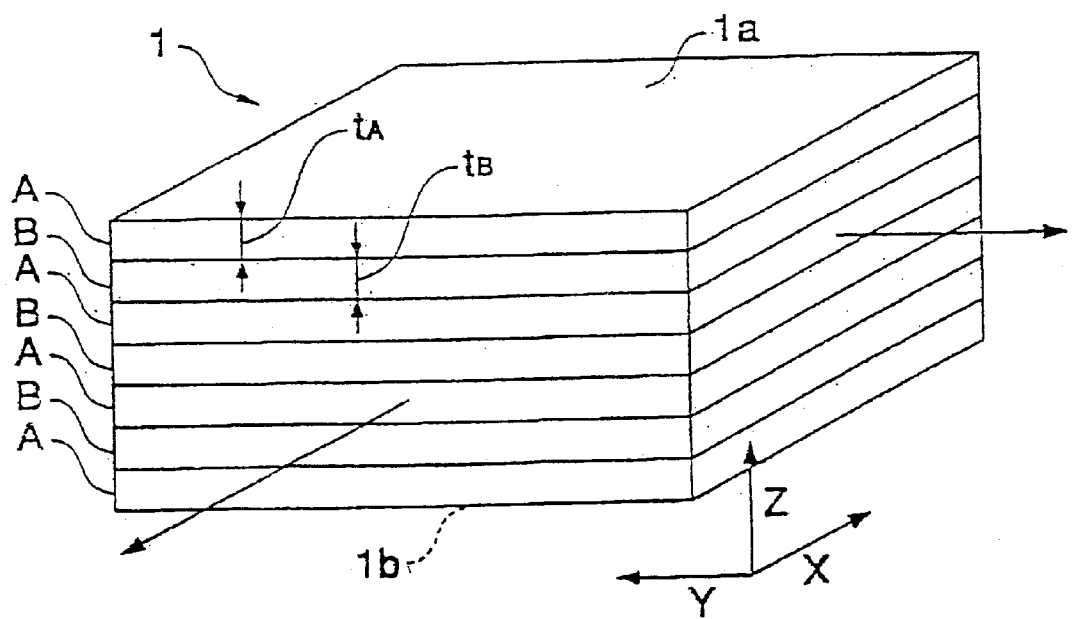
FIG. 5 is an explanatory view of a polarized-light separation film used for a polarized-light separating member in the present invention.

This polarized-light separation film has, for example, as shown in FIG. 5, a structure of a plurality of layers formed by alternately stacking layers A and layers B. The refractive index $n_{AX}$ in the X direction and the refractive index $n_{AY}$ in the Y direction of the layers A are different from each other. The refractive index $n_{BX}$ in the X direction and the refractive index $n_{BY}$ in the Y direction of the layers B are equal to each other. In addition, the refractive index $n_{AY}$ in the Y direction of the layers A and the refractive index $n_{BY}$ in the Y direction of the layers B are equal to each other.

Accordingly, if light enters a top surface 1a of the polarized-light separation film 1 from the direction perpendicular to the surface, linearly polarized light in the Y direction of the light is transmitted by the polarized-light separation film 1 to be emitted from a bottom surface 1b as light of linear polarization in the Y direction. Conversely, if light enters the bottom surface 1b of the polarized-light separation film 1 from the direction perpendicular to the surface, linearly polarized light in the Y direction of the light is transmitted by the polarized-light separation film 1 to be emitted from the top surface 1a as light of linear polarization in the Y direction. Here, the Y direction to be transmitted is referred to as a transmitted light polarization axis (transmission axis).

On the other hand, if the thickness of the layer A in the Z direction is taken as $t_A$, the thickness of the layer B in the Z direction is taken as $t_B$, and the wavelength of the incident light is taken as γ, by setting optical characteristics to satisfy the following expression, $$t_A \cdot n_{AX} + t_B \cdot n_{BX} = \lambda/2 \quad (1).$$

When light of wavelength λ is incident on the top surface 1a of the polarized-light separation film 1 from the direction perpendicular to the surface, light of linear polarization in the X direction of the light is reflected by the polarized-light separation film 1 as light of linear polarization in the direction. In addition, light of linear polarization, which is the light of wavelength λ and incident on the bottom surface 1b of the polarized-light separation film from the direction perpendicular to the surface, is reflected by the polarized-light separation film 1 as light of linear polarization. Here, the X direction to be reflected is referred to as a reflection axis.

Also, in the polarized-light separation film 1, if the thickness $t_A$ of the layer A in the Z direction and the thickness $t_B$ of the layer B in the Z direction are variously changed so as to allow the above expression (1) over a certain wavelength range of visible light, only light in a certain. wavelength region ($\Delta\lambda$) can be reflected, and light in other wavelength regions ($-\Delta\lambda$) can be transmitted. That is, the linearly polarized light component in the Y direction can be transmitted as the linearly polarized light in the Y direction, and light, which is a linearly polarized light component in the X direction and in other wavelength regions ($-\Delta\lambda$), can be transmitted as the linearly polarized light in the X direction.

Any reflecting element can be used as the reflecting element 5. For example, a total reflection optical element for mirror-reflecting all incident linearly polarized light components, or a partial reflection optical element for mirror-reflecting a part of the incident light and transmitting other light, can be used.

Here, as the total reflection optical element, a total reflection mirror can be used. In addition, as the total reflection optical element, if incident light is a linearly polarized light component such that a transmitted light polarization axis is directed to a specific direction, a polarized-light separation film or the like for reflecting light in this direction and transmitting a linearly polarized light component pointing in a direction perpendicular to this direction can also be used.

In contrast, the partial reflection optical element is, for example, a half mirror having a metal thin layer (aluminum thin film) formed on a surface of a light-transmitting base material. This half mirror is formed by evaporating aluminum and the like on a film which is optically transparent.

In addition, as the partial reflection optical element, if the incident light is a linearly polarized light component such that a transmitted light polarization axis is directed in a specific direction (for example, a second direction), a third polarized-light separation film for transmitting a linearly polarized light component pointing in a direction forming a predetermined angle with this direction, and reflecting a linearly polarized light component pointing in a direction perpendicular to this direction can be utilized. The third polarized-light separating member can also use the polarized-light separation film 1 described with reference to FIG. 5. In the third polarized-light separating member, a transmission direction and the second direction, which is a direction of the transmitted light polarization axis of the linearly polarized light component incident on the third polarized-light separating member are offset each other by a predetermined angle, whereby the third polarized-light separating member can be used as a partial reflection optical element for mirror-reflecting a part of the incident linearly polarized light component and transmitting a part of light. That is, by slightly offsetting the directions of the transmitted polarization axes of two polarized-light separation films, a partial reflection optical element can be constructed.

Figure 6:
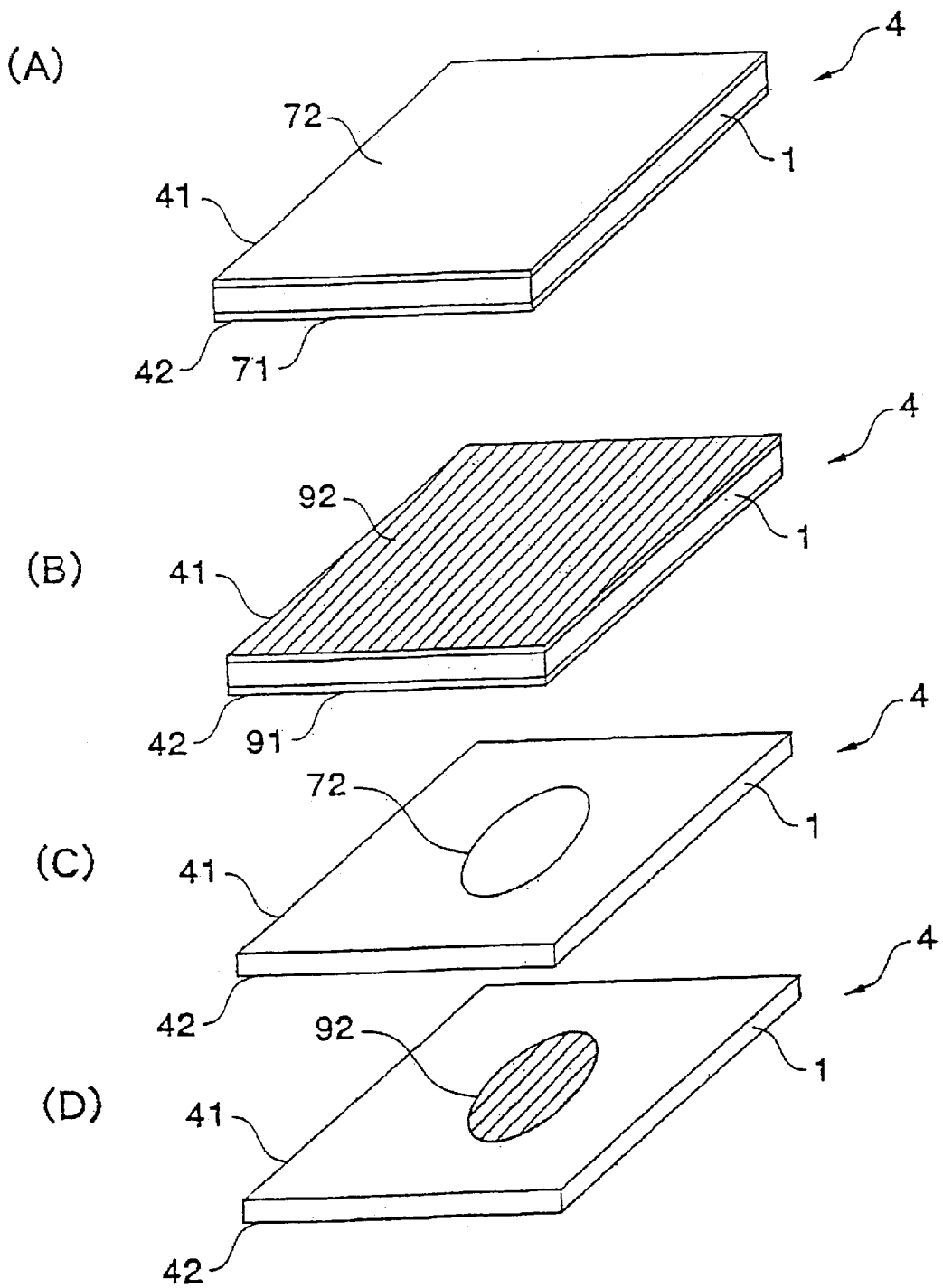
FIGS. 6(A), 6(B), 6(C), and 6(D) are an explanatory view showing a state where a coloring layer (modified layer) is formed on the entire face of the polarized-light separation film shown in FIG. 5, an explanatory view showing a state where a light-diffusing layer (modified layer) is formed on the entire face of the polarized-light separation film shown in FIG. 5, an explanatory view showing a state in which a coloring layer (modified layer) is partially formed on the polarized-light separation film shown in FIG. 5, and an explanatory view showing a state where a light-diffusing layer (modified layer) is partially formed on the polarized-light separation film shown in FIG. 5, respectively.

In the present invention, as the modified layer formed on the back 42 or the surface 41 of the second polarized-light separating member 4, for example, as shown in FIG. 6(A), the back side or the surface-side coloring layer 71 or 72 attached to back 42 or the surface 41 of the second polarized-light separating member 4 can be used. As the back-side and surface-side coloring layers 71 and 72, a color filter obtained by printing or coating the entire surface of the second polarized-light separating member 4 (polarized-light separation film 1) by methods such as an ink jet printer, screen printing, spraying, and dipping, is most common and lowest in cost. Of these methods, when water-based ink is used, particularly, when an ink jet printer is used, it is preferable that the back 42 or the surface 41 of the second polarized-light separating member 4 be treated so as to be hydrophilic. In the present invention, a dyeing layer that is attached to a resin layer constituting the polarized-light separation film 1 used as the second polarized-light separating member 4 may be utilized as the back-side or the surface-side coloring layer 71 or 72. That is, since the aforementioned polarized-light separation film 1 is formed of polyester resin, the polyester resin is dyed by a dye for resin that is a dispersion-dye having low-viscosity using a special glycolether blended with an anionic surface-active agent. In this dyeing step, 20 cc of water is added to an undiluted solution of the dye for resin to be used as a dye solution, and the temperature is kept at 70° C.±10° C. Then, the polarized-light separation film 1, from which only one protection sheet is peeled off, and is dipped into the dye solution which is stirred for five to eight minutes. The thus-dyed polarized-light separation film is washed with water and dried. When the thus-composed layer is used as a coloring layer, compared to a case where the color filter is used, there is an advantage that the rotation of the transmitted light polarization axis due to the color filter can be neglected. In addition, since scattered reflections on the surface of the color filter are eliminated, there is an advantage of bright display. Moreover, since displays of various textures of materials can be made according to the method of dyeing, a display with an impression of high quality can be made.

In the present invention, as the modified layer formed on the back 42 or the surface 41 of the second polarized-light separating member 4, for example, as shown in FIG. 6(B), the back-side or the surface-side light-diffusing layer 91 or 92 attached on the back 42 or the surface 41 of the second polarized-light separating member 4 can also be utilized. As the back-side and the surface-side light-diffusing layers 91 and 92, layers having satin-like or concentric corrugated patterns (texture) formed on the entire surface of the second polarized-light separating member 4 (polarized-light separation film 1) can be utilized. In addition, with regard to the light-diffusing layers 91 and 92, a light-scattering coating film obtained by printing or coating the surface 41 or the back 42 of the second polarized-light separating member 4 (polarized-light separation film 1) by methods, such as ink jet printing, screen printing, spraying, and dipping, may be utilized. Furthermore, since the back-side and the surface-side light-diffusing layers 91 and 92 may only diffusse light, translucent marks may be attached thereto. In any case, with regard to a degree of light diffusion, a haze rate of about 10% to 60% represented by the following expression is preferable.

Haze ratio (%)=(scattered light beam transmittance)÷(total light beam transmittance)×100

In addition, in the present invention, as the surface-side coloring layer 72 and the surface-side light-diffusing layer 92 are shown in FIGS. 6(C) and 6(D), the modified layer (coloring layer, light-diffusing layer) may be formed not on the entire back 42 or the entire surface 41 of the second polarized-light separating member 4, but may be formed as a pattern or a mark in a predetermined area thereof In the present invention, in the case of using the partial reflection optical element for reflecting a part of the incident linearly polarization components and transmitting other light as the reflecting element 5, if a light source for a backlight capable of emitting light toward the reflecting element is disposed between the second polarized-light separating member 4 and the reflecting element 5 at a position for sandwiching the reflecting element 5, display can be effected even at an area without external light. As the light source for a backlight, an EL (electroluminescent) element, a cold-cathode ray tube, and an LED (Light Emitting Diode) and the like can be used.

Each of the display devices constructed using such optical parts will now be described. While components are spaced apart in the drawings in all the embodiments described below, the components are bonded in tight contact to each other in use.

[First Embodiment]

Figure 7:
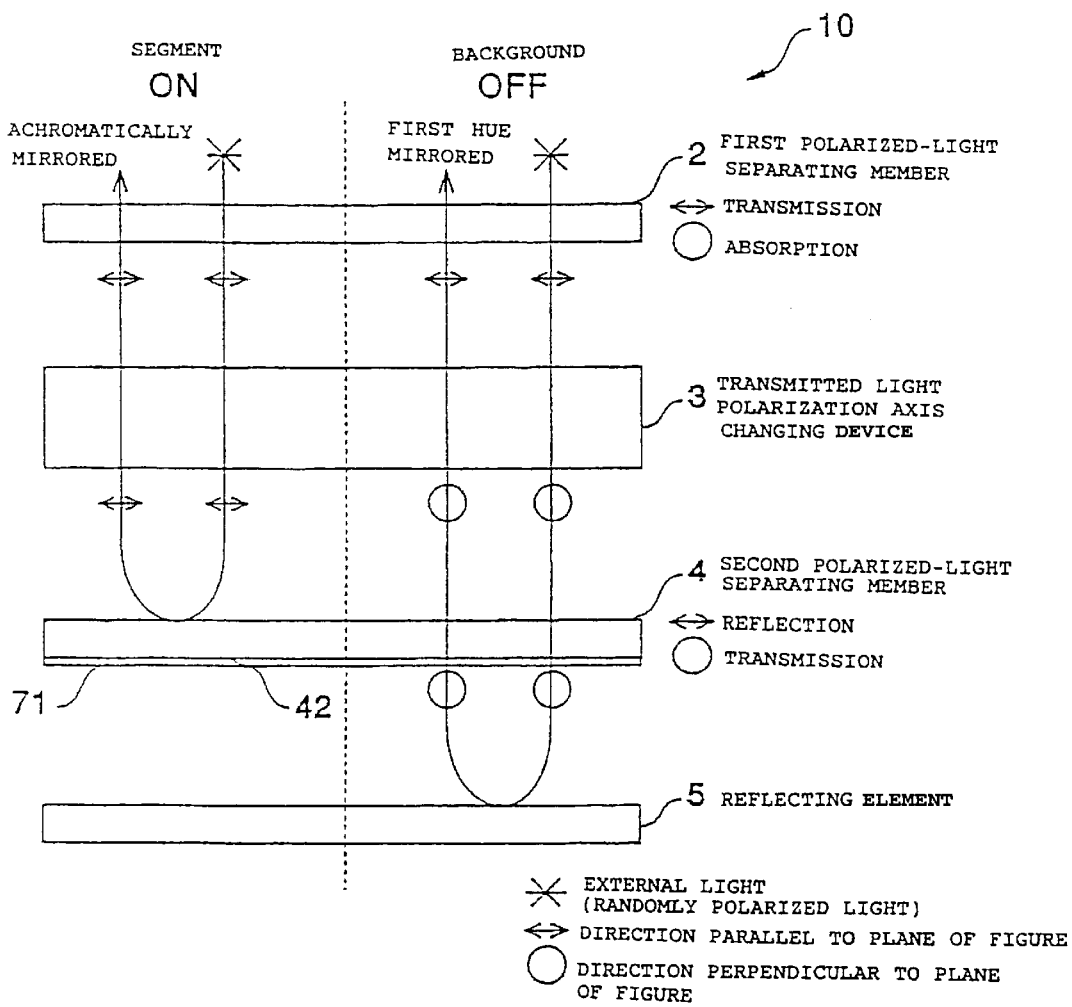
FIG. 7 is a schematic structural view of a display device according to a first embodiment of the present invention.

FIG. 7 is a schematic structural view of a display device according to a first embodiment of the present invention.

Referring to FIG. 7, in a display device 10 of this embodiment, a first polarized-light separating member 2 for transmitting a linearly polarized light component of incident light pointing in a first direction of incident light, a transmitted light polarization axis changing device 3 capable of selecting one of a first state of changing and a second state of not changing a transmitted light polarization axis when the incident linearly polarized light component is transmitted, a second polarized-light separating member 4 for transmitting a linearly polarized light component facing a second direction of incident linearly polarized light components and reflecting a linearly polarized light component facing a third direction intersecting perpendicularly to the second direction, and a reflecting element 5 capable of mirror-reflecting the linearly polarized light component transmitted by the second polarized-light separating member 4 toward the second polarized-light separating member 4 at a position for sandwiching the second polarized-light separating member 4 between the transmitted light polarization axis changing device 3 and the reflecting element 5 are disposed in that order. Here, the reflecting element 5 is a total reflection optical element for mirror-reflecting all or nearly all of the incident light.

In addition, on a back 42 of the second polarized-light separating member 4 facing the reflecting element 5, a back-side coloring layer 71 for coloring and emitting the incident light is formed.

Accordingly, the display device is constructed so that predetermined information can be displayed by first return light reflected by the reflecting element 5 to be transmitted by the second polarized-light separating member 4, the transmitted light polarization axis changing device 3, and the first polarized-light separating member 2, and second return light reflected by the second polarized-light separating member 4 to be transmitted by the transmitted light polarization axis changing device 3 and the first polarized-light separating member 2 of external light incident on the first polarized-light separating member 2 from the opposite side of the transmitted light polarization axis changing device 3.

Such a display operation will be described in detail. First, an electronic timepiece effects a reflective-type display utilizing external light at an area exposed to the external light. In addition, in the case where a background is to be displayed on a display surface of the electronic timepiece, a liquid crystal device (transmitted light polarization axis changing device 3) in the area is set to the OFF state. In the case of segment-displaying information such as a numeral on the display surface, the liquid crystal device in the area is set to the ON state.

If the external light enters the electronic timepiece in this state, a linearly polarized light component of the external light in the direction parallel to the plane of the figure is transmitted by the first polarized-light separating member 2, while a linearly polarized light component in the direction perpendicular to the plane of the figure is absorbed by the first polarized-light separating member 2.

Next, in a non-applied voltage (OFF) area in the transmitted light polarization axis changing device 3, the polarization direction of the linearly polarized light in the direction parallel to the plane of the figure is twisted 90° by a TN liquid crystal to be changed to linearly polarized light in the direction perpendicular to the plane of the figure. This linearly polarized light reaches the second polarized-light separating member 4.

This linearly polarized light in the direction perpendicular to the plane of the figure is transmitted by the second polarized-light separating member 4, and passes through the back-side coloring layer 71 to reach the reflecting element 5.

Then, the linearly polarized light in the direction perpendicular to the plane of the figure reflected by the reflecting element 5 is transmitted by the second polarized-light separating member 4, and enters the transmitted light polarization axis changing device 3. The polarization direction of the linearly polarized light component entering into the transmitted light polarization axis changing device 3 is twisted 90° by the TN liquid crystal again to be turned into linearly polarized light in the direction parallel to the plane of the figure. Accordingly, the first return light reflected by the reflecting element 5 is emitted as the linearly polarized light in the direction parallel to the plane of the figure from the first polarized-light separating member 2. Therefore, the background is displayed in a chromatic (first hue) defined by the back-side coloring layer 71.

In contrast, in a voltage applied (ON) area, the linearly polarized light in the direction parallel to the plane of the figure of the external light, transmitted by the first polarized-light separating member 2, is emitted from the transmitted light polarization axis changing device 3 without being changed in the polarization direction by the TN liquid crystal, and reaches the second polarized-light separating member 4. This linearly polarized light in the direction parallel to the plane of the figure is reflected by the second polarized-light separating member 4. Since the second polarized-light separating member 4 is formed of the polarized-light separation film 1 described with reference to FIG. 5, it mirror-reflects light emitted from the transmitted light polarization axis changing device 3.

The linearly polarized light in the direction parallel to the plane of the figure (second return light) reflected by the second polarized-light separating member 4 enters into the transmitted light polarization axis changing device 3. The linearly polarized light component entering into the transmitted light polarization axis changing device 3 is emitted as linearly polarized light in the direction parallel to the plane of the figure without change in the polarization direction. Accordingly, the second return light reflected by the second polarized-light separating member 4 is emitted as linearly polarized light in the direction parallel to the plane of the figure from the first polarized-light separating member 2. Therefore, the segment section is displayed in a mirror form of an achromatic color.

In this way, in this embodiment, light transmitted by an area in the transmitted light polarization axis changing device 3 for changing the transmitted light. polarization axis and light transmitted by an area for not changing the transmitted light polarization axis reach the user's eye as the linearly polarized light components return light) reflected by the reflecting element 5 to be transmitted by the second polarized-light separating member 4, the transmitted light polarization axis changing device 3, and the first polarized-light separating member 2, and the linearly polarized light component (second return light) reflected by the second polarized-light separating member 4 to be transmitted by the transmitted light polarization axis changing device 3 and the first polarized-light separating member 2, so that, for example, both of a background portion and a segment portion in an electronic timepiece or the like can be displayed brightly. Therefore, there is an advantage of high visibility of display. In addition, since the linearly polarized light transmitted by the second polarized-light separating member 4, the transmitted light polarization axis changing device 3, and the first polarized-light separating member 2 is mirror-reflected by the reflecting element 5, the background portion or the segment portion in the electronic timepiece or the like can be displayed in a mirror form.

Furthermore, since the linearly polarized light transmitted by the second polarized-light separating member 4, the transmitted light polarization axis changing polarization axis changing device 3, and the first polarized-light separating member 2 is colored by the back-side coloring layer 71 of the second polarized-light separating member 4, the background portion can be formed in colored mirror form in an electronic timepiece or the like. Moreover, since the back-side coloring layer 71 is attached to the second polarized-light separating member 4, the number of parts is not increased.

[Second Embodiment]

Figure 8:
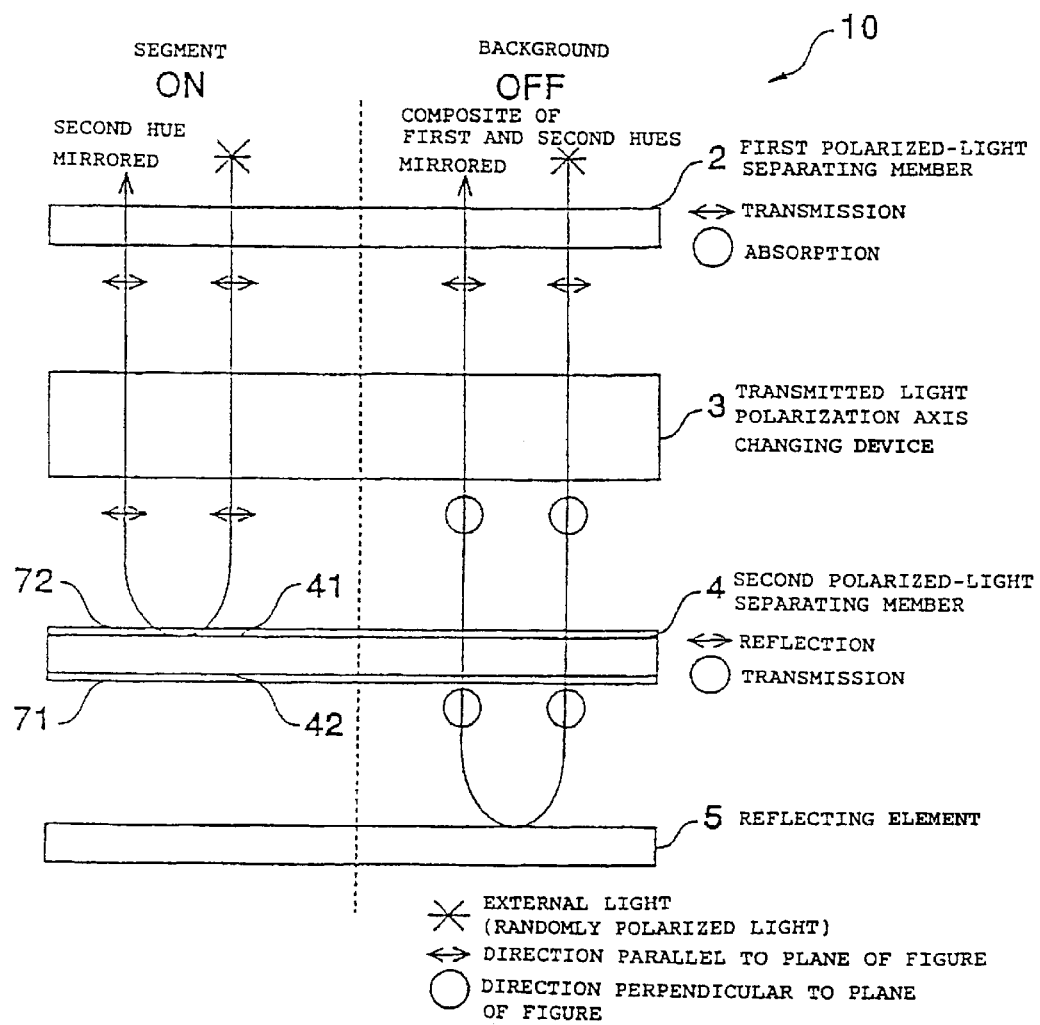
FIG. 8 is a schematic structural view of a display device according to a second embodiment of the present invention.

FIG. 8 is a schematic structural view of a display device according to a second embodiment of the present invention.

In the first embodiment 1, the segment portion equivalent to the voltage applied area (ON) in the transmitted light polarization axis changing device 3 is displayed in an achromatic mirror form. As shown in FIG. 7, however, if a surface-side coloring layer 72 is formed on a surface 41 of the second polarized-light separating member 4 facing the transmitted light polarization axis changing device 3, a segment portion is displayed in a mirror form with a hue (second hue) determined by the surface-side coloring layer 72. In this case, a background portion equivalent to the non-applied voltage (OFF) area in the transmitted light polarization axis changing device 3 is displayed in a mirror form with a composite hue of a hue imparted by a back-side coloring layer 71 and a hue imparted by the surface-side coloring layer 72.

[Third Embodiment]

Figure 9:
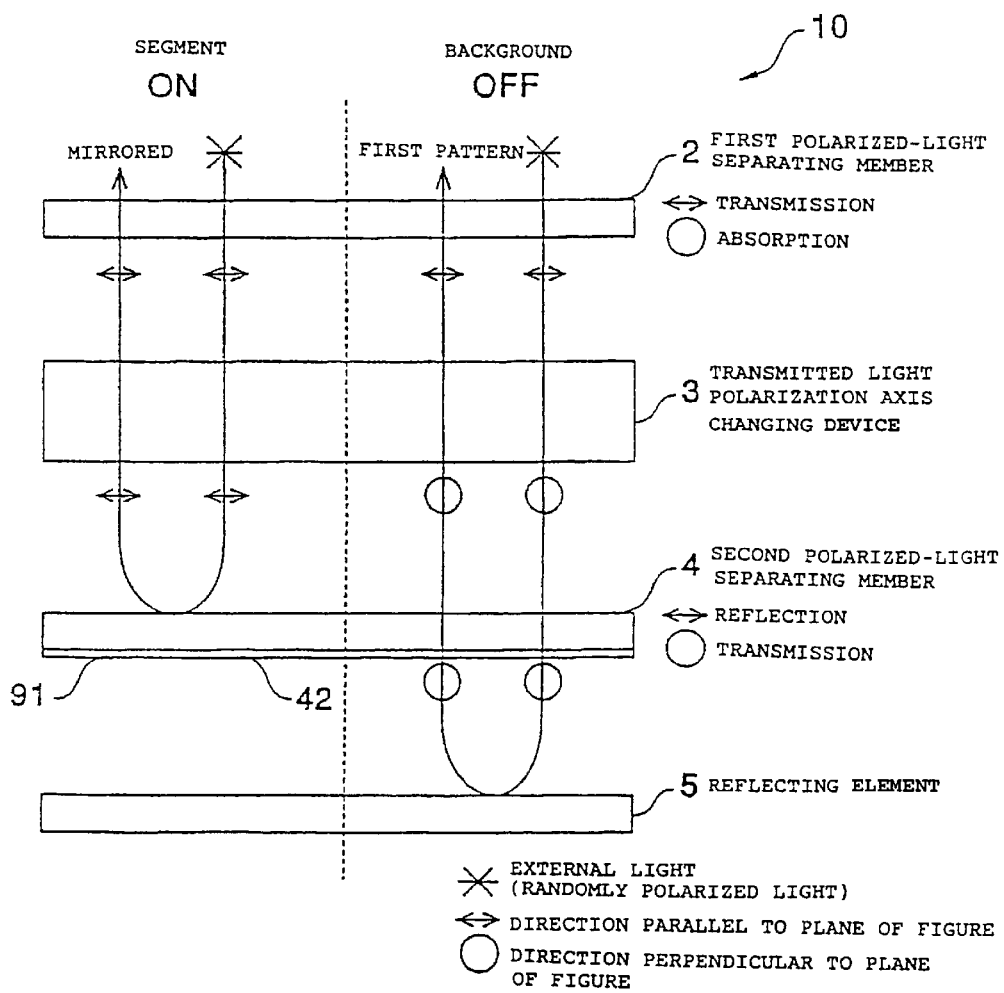
FIG. 9 is a schematic structural view of a display device according to a third embodiment of the present invention.

FIG. 9 is a schematic structural view of a display device according to a third embodiment of the present invention.

As will be understood from FIG. 9, in this embodiment, a back-side light-diffusing layer 91 is formed on a back 42 facing a reflecting element 5 of a second polarized-light separating member 4, and unlike in the first and second embodiments, no coloring layers are formed. With this construction, a segment portion is displayed in an achromatic mirror form. In contrast, in a background area, while a linearly polarized light component is being transmitted by the second polarized-light separating member 4, a transmitted light polarization axis changing device 3, and a first polarized-light separating member 2 after being transmitted by the second polarized-light separating member 4 and mirror-reflected by the reflecting element 5, the linearly polarized light component is subjected to light diffusion by the back-side light-diffusing layer 91 of the second polarized-light separating member 4, so that a background portion is displayed not in a mirror form, but in a state where a fine first pattern is drawn thereon by the back-side light-diffusing layer 91, such as a texture. In addition, since the back-side light diffusing layer 9 is formed on the second polarized-light separating member 4, the number of parts is not increased.

[Fourth Embodiment]

Figure 10:
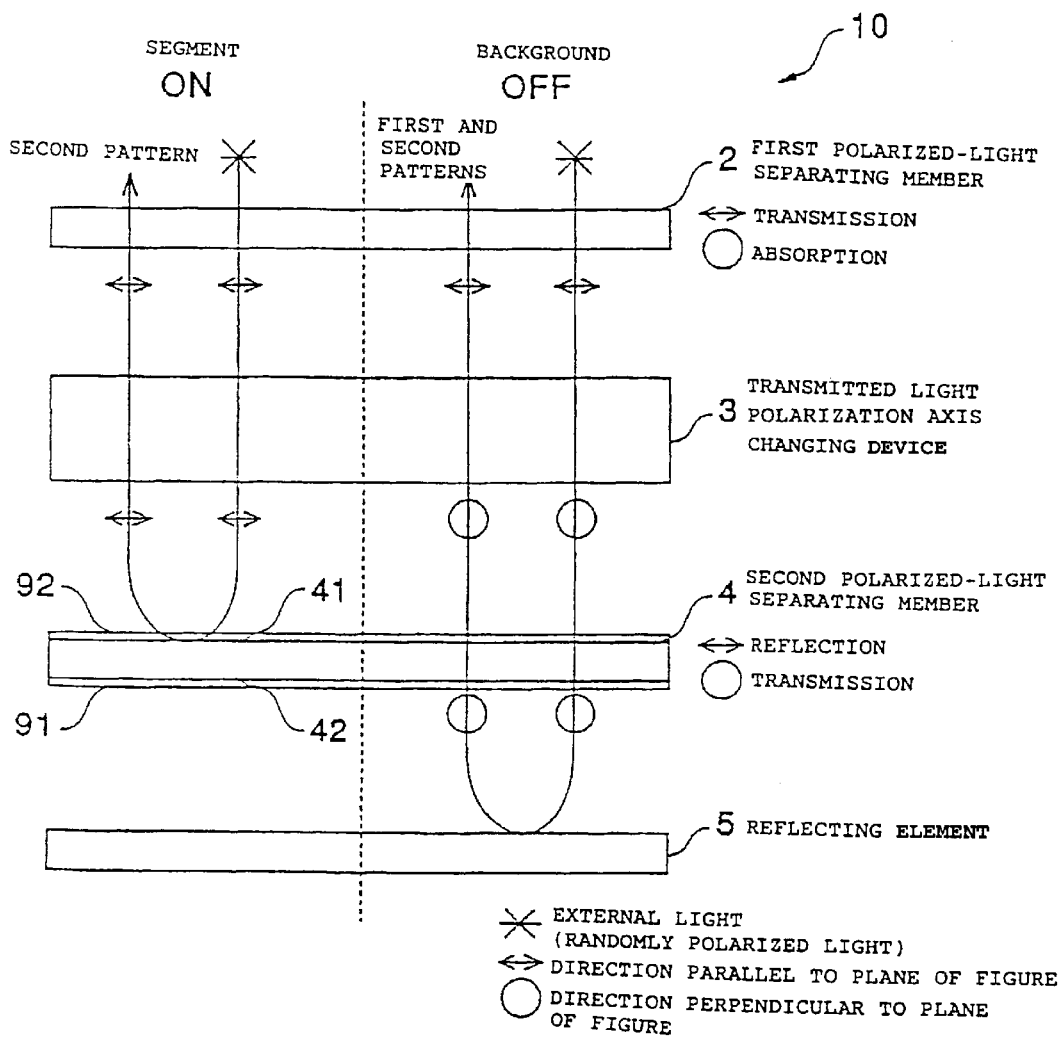
FIG. 10 is a schematic structural view of a display device according to a fourth embodiment of the present invention.

FIG. 10 is a schematic structural view of a display device according to a fourth embodiment of the present invention.

In the third embodiment, the segment portion equivalent to the voltage applied (ON) area in the transmitted light polarization axis changing device 3 is displayed in an achromatic mirror form. As shown in FIG. 10, however, if a surface-side light-diffusing layer 92 is formed on a surface 41 facing the transmitted light polarization axis changing device 3 of the second polarized-light separating member 4, a segment portion is also displayed in a state where a fine second pattern is drawn thereon by a texture serving as a surface-side light-diffusing layer 92. In addition, a background portion equivalent to the non-applied voltage (OFF) area in the transmitted light polarization axis changing device 3 is displayed in a state where the first and second patterns drawn on a back-side light-diffusing layer 91 and the surface-side light-diffusing layer 92 are combined.

[Fifth Embodiment]

Figure 11:
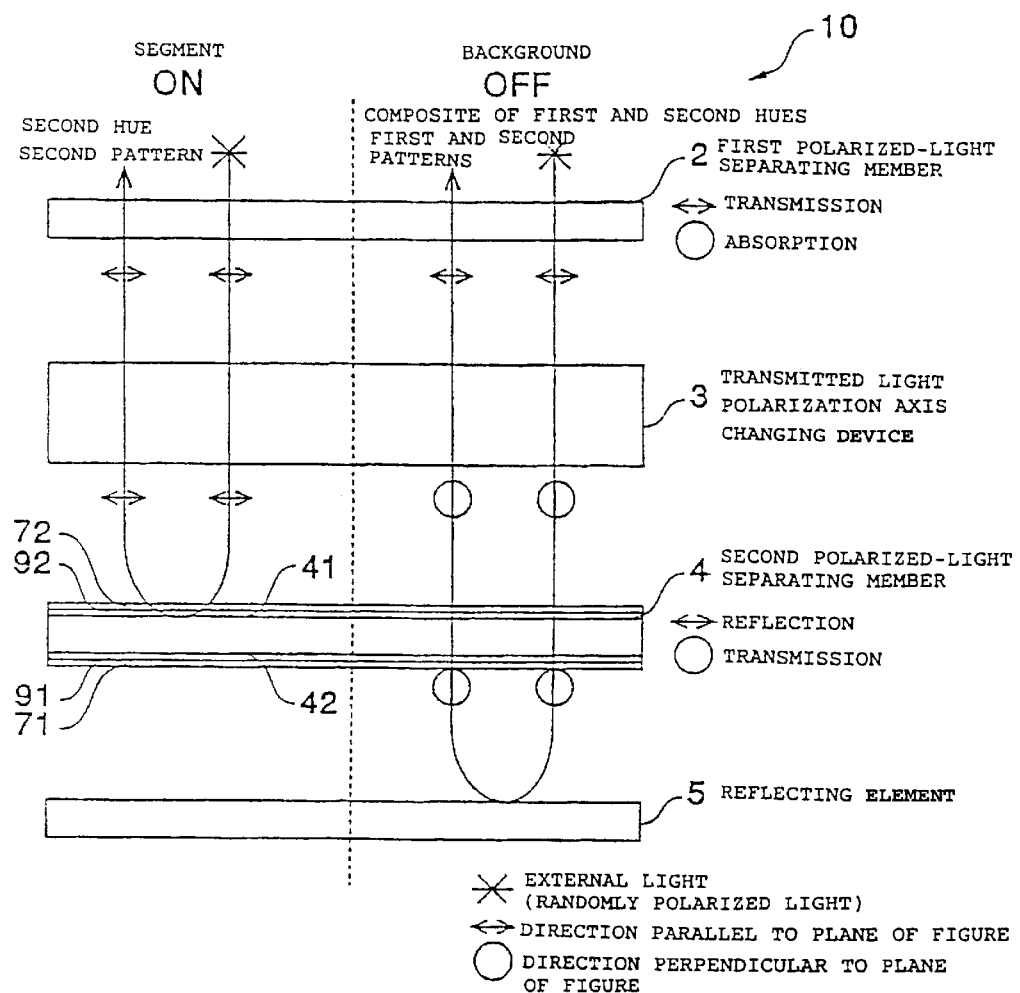
FIG. 11 is a schematic structural view of a display device according to a fifth embodiment of the present invention.

FIG. 11 is a schematic structural view of a display device according to a fifth embodiment of the present invention.

In the second embodiment, the segment portion equivalent to the voltage applied (ON) area in the transmitted light polarization axis changing device 3 is displayed in a mirror form with a hue defined by the surface-side coloring layer 72. As shown in FIG. 11, however, if a surface-side coloring layer 72 and a surface-side light-diffusing layer 92 are formed on the side of a surface 41 facing the transmitted light polarization axis changing device 3 of the second polarized-light separating member 4, the segment portion is displayed with the second hue determined by the surface-side coloring layer 72 and with the second pattern formed as the surface-side light-diffusing layer 92. In contrast, a background portion equivalent to the non-applied voltage (OFF) area in the transmitted light polarization axis changing device 3 is displayed with a composite hue of a first hue imparted by a back-side coloring layer 71 and a second hue imparted by the surface-side coloring layer 72 and in a state where a first pattern drawn on a back-side light-diffusing layer 91 and a second pattern drawn on the surface-side light-diffusing layer 92 are combined.

The order of deposition of the back-side coloring layer 71 and the back-side light-diffusing layer 91 may be reversed. Similarly, the order of deposition of the surface-side coloring layer 72 and the surface-side light-diffusing layer 92 may be reversed.

[Sixth Embodiment]

Figure 12:
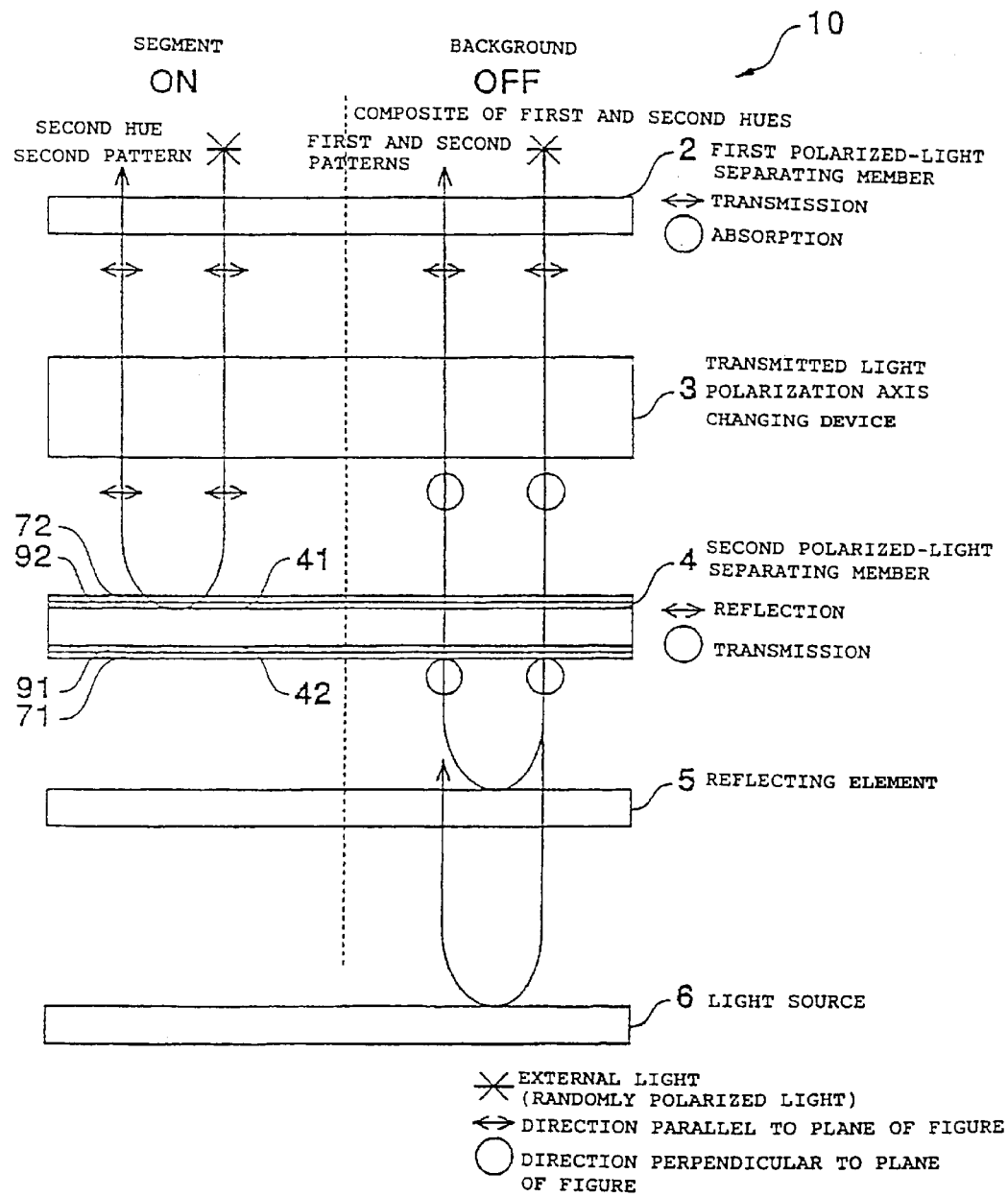
FIG. 12 is a schematic structural view of a display device according to a sixth embodiment of the present invention.

FIG. 12 is a schematic structural view of a display device according to a sixth embodiment of the present invention.

In the display devices 10 according to the first to fifth embodiments, the reflecting element 5 is a total reflection optical element for mirror-reflecting all or nearly all of the incident linearly polarized light component. In this embodiment, however, as shown in FIG. 12, a partial reflection optical element for mirror-reflecting a part of the incident linearly polarized light component and for transmitting other light is used as a reflecting element 5. While such a configuration can be configured based on any one of the first to fifth embodiments, an example will be herein described in which the reflecting element 5 is a partial reflection optical element in the display device 10 according to the fifth embodiment.

In this embodiment, a first polarized-light separating member 2 for transmitting a linearly polarized light component pointing in a first direction of incident light, a transmitted light polarization axis changing device 3 capable of selecting one of a first state of changing and a second state of not changing a transmitted light polarization axis when the incident linearly polarized light component is transmitted, a second polarized-light separating member 4 for transmitting a linearly polarized light component pointing in a second direction of incident linearly polarized light components and reflecting a linearly polarized light component pointing in a third direction perpendicularly intersecting the second direction, and a reflecting element 5 capable of mirror-reflecting the linearly polarized light component transmitted by the second polarized-light separating member 4 toward the second polarized-light separating member 4 at a position for sandwiching the second polarized-light separating member 4 between the transmitted light polarization axis changing device 3 and the reflecting element 5 are also disposed in that order. Furthermore, a light source 6 for backlight is disposed with respect to the reflecting element 5 on the opposite side of the second polarized-light separating member 4.

Here, the reflecting element 5 is, for example, a half mirror (partial reflection optical element) having a metal thin layer formed on a surface of a light-transmitting base material. In addition, a polarized-light separation film 1 (third polarized-light separating member) can be used which is disposed in a manner such that a transmitted light polarization axis (transmission axis) is slightly offset with respect to the second polarized-light separating member 4.

In addition, in this embodiment, a back-side coloring layer 71 and a back-side light-diffusing layer 91 are formed on a back 42 of the second polarized-light separating member 4, and a surface-side coloring layer 72 and a surface-side light-diffusing layer 92 are formed on a surface 41 of the second polarized-light separating member 4. Accordingly, when display is effected by external light, the display is effected in the same form as in the fifth embodiment.

That is, in effecting reflective display utilizing external light, since the reflecting element 5 is a partial reflection optical element, such as a half mirror, a part of the light incident on the reflecting element 5 is transmitted toward the light source 6. Light transmitted toward the light source 6 is, however, reflected by the surface of the light source 6 with a sufficient amount of light toward the reflecting element 5 so as to be utilized for display.

Here, in the display device 10, a partial transmission optical element is used as the reflecting element 5 for effecting reflective display utilizing external light, and the light source 6 for backlight is disposed behind the partial transmission optical element. Accordingly, at a location with insufficient external lighting or during the night, transmissive display utilizing the light source 6 can be effected.

Figure 13:
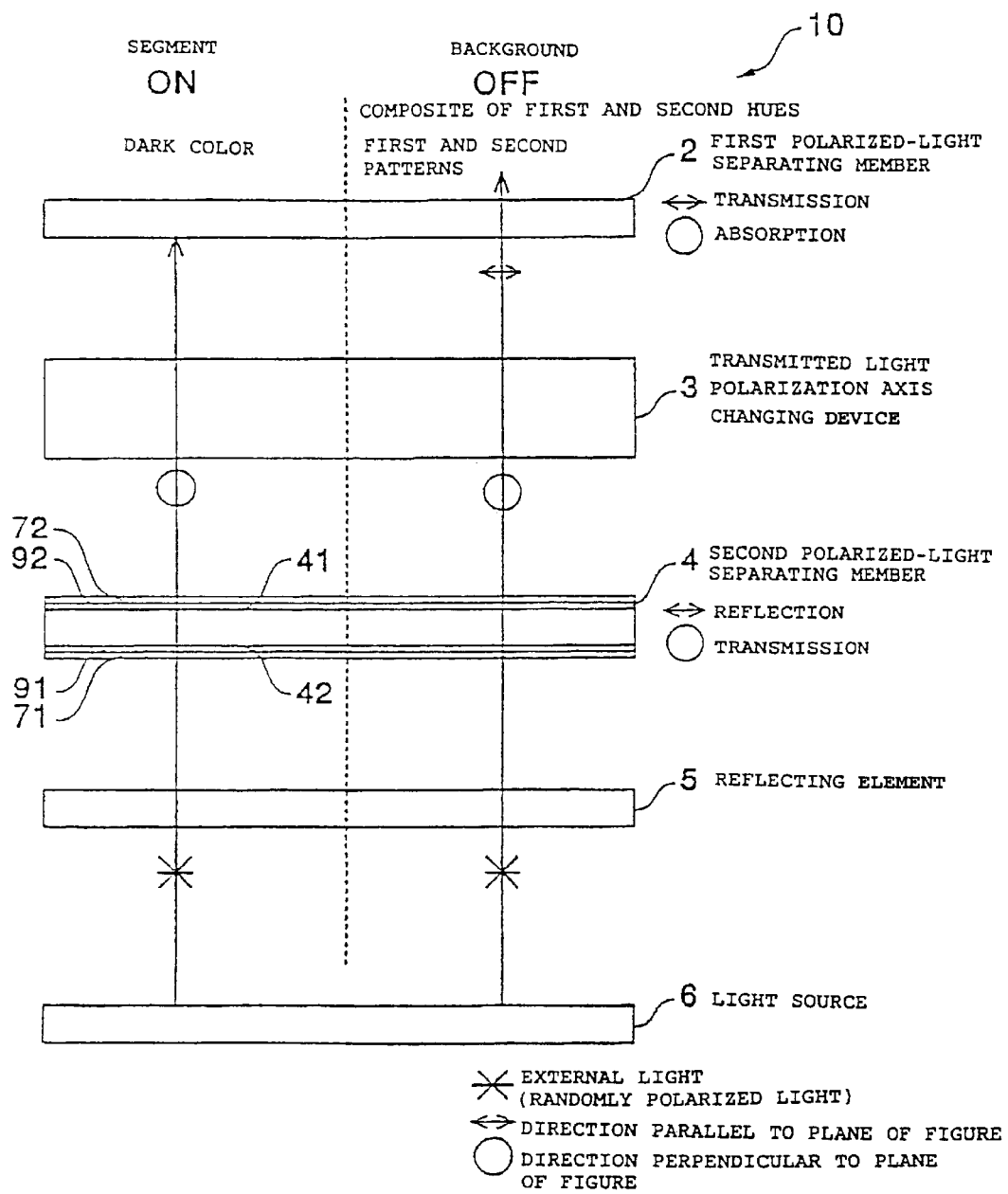
FIG. 13 is an explanatory view showing an operation for effecting transmissive display using a light source for backlight in the display device shown in FIG. 12.

That is, in the display device 10 of this embodiment, as shown in FIG. 13, when the light source 6 is lit, light emitted from the light source 6 is first transmitted by the reflecting element 5 of the transflective-type composed of a half mirror or the like, and is transmitted by the back-side coloring layer 71 and the back-side light-diffusing layer 91 so as to enter the second polarized-light separating member 4. The second polarized-light separating member 4 transmits a linearly polarized light component pointing in the second direction of the incident linearly polarized light components toward the transmitted light polarization axis changing device 3, and mirror-reflects a linearly polarized light component pointing in a direction perpendicularly intersecting the second direction. That is, of the linearly polarized light in the direction parallel to the plane of the figure and the linearly polarized light in the direction perpendicular to the plane of the figure incident on the second polarized-light separating member 4, the linearly polarized light component in the direction perpendicular to the plane of the figure is transmitted by the second polarized-light separating member 4. Accordingly, the linearly polarized light component in the direction perpendicular to the plane of the figure is transmitted by the surface-side coloring layer 72 and the surface-side light-diffusing layer 92 to enter into the transmitted light polarization axis changing device 3.

Here, an area that should be a background portion on a display surface of an electronic timepiece is set to the OFF state, whereas a segment portion that should display information, such as numerals, is set to the ON state. Accordingly, since the linearly polarized light in the direction perpendicular to the plane of the figure incident on a voltage applied (ON) area is unchanged in the direction perpendicular to the plane of the figure even after being transmitted by the transmitted light polarization axis changing device 3, the linearly polarized light is not transmitted by the first polarized-light separating member 2. Accordingly, where it is dark and display by the reflection of external light cannot be effected, the segment portion is dark which is nearly black.

In contrast, the area that should be the background portion of the electronic timepiece is set to the OFF state. Accordingly, the polarization direction of the linearly polarized light incident on a non-applied voltage (OFF) section is twisted 90° by a TN liquid crystal to be turned into linearly polarized light in the direction parallel to the plane of the figure, so that it is transmitted by the first polarized-light separating member 2. Therefore, the background portion is displayed with a composite hue of a hue imparted by the back-side coloring layer 71 and a hue imparted by a surface-side coloring layer 72, and with a composite pattern of a first pattern drawn on the back-side light-diffusing layer 91 and a second pattern drawn on the surface-side light-diffusing layer 92.

[Seventh Embodiment]

Figure 14:
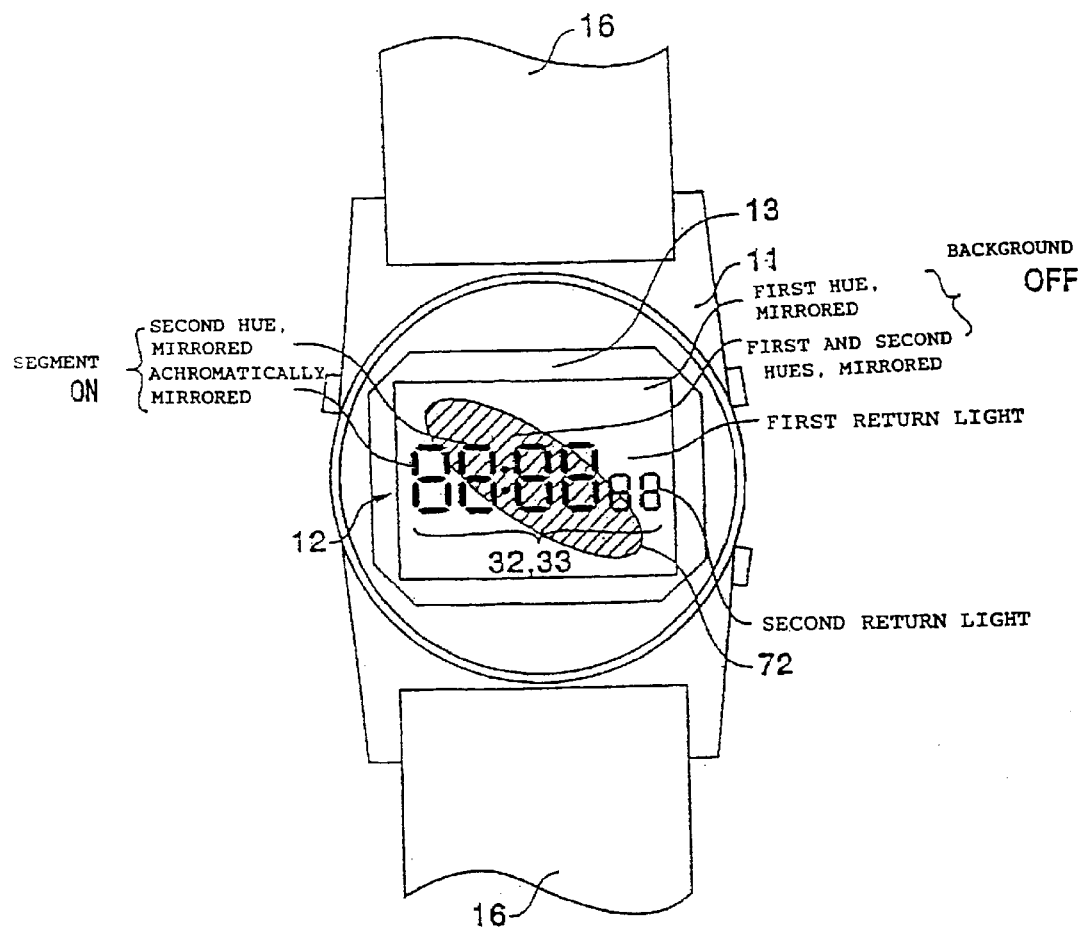
FIG. 14 is an explanatory view showing a state of a display device according to a seventh embodiment of the present invention.
Figure 15:
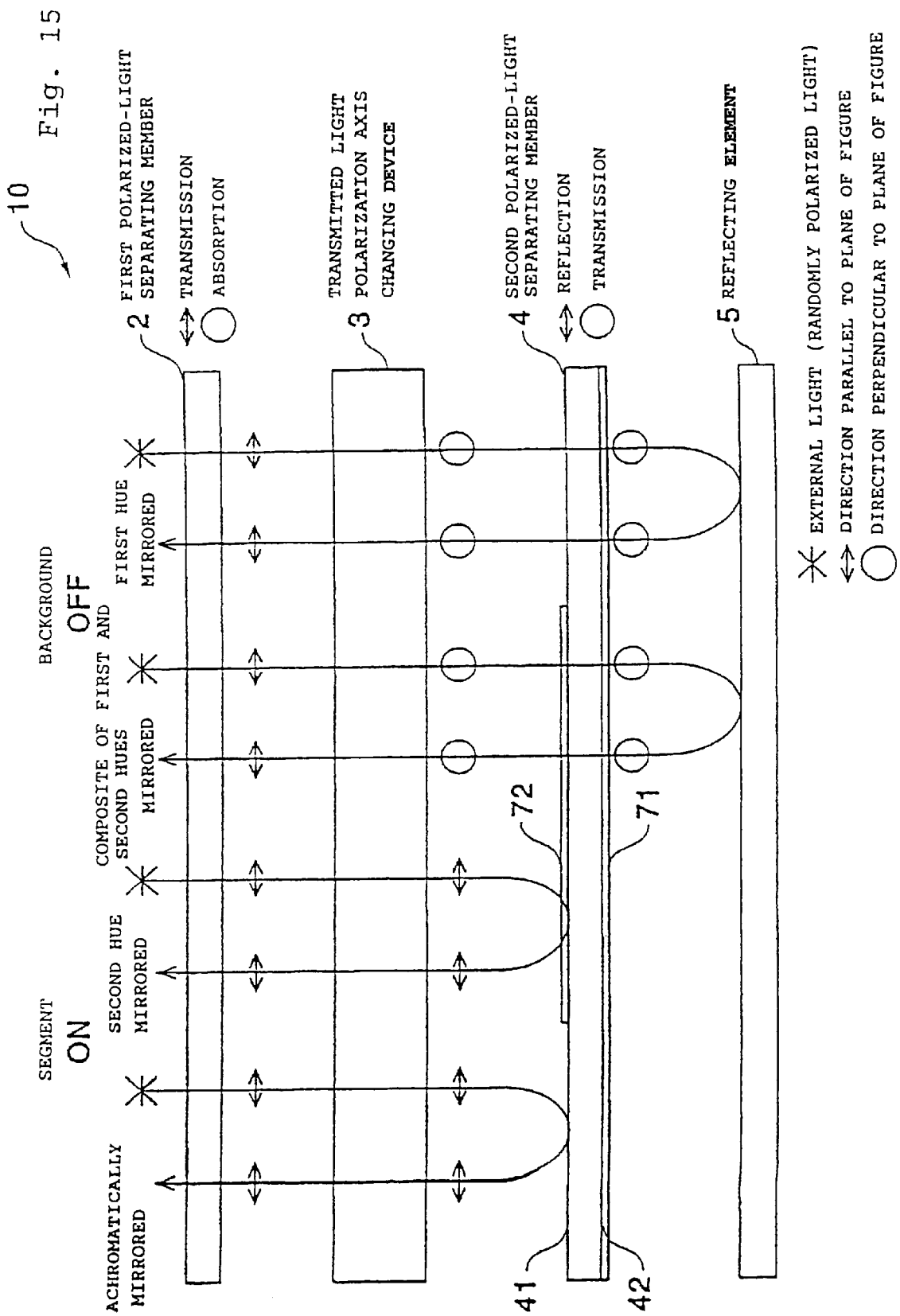
FIG. 15 is a schematic structural view of a display device according to the seventh embodiment of the present invention.

FIG. 14 and FIG. 15 are a plan view and a schematic-structural view showing a display form of a display device according to a seventh embodiment of the present invention, respectively.

In the display devices 10 according to the first to sixth embodiments, the modified layer (for example, the back-side coloring layer 71, the surface-side coloring layer 72, the back-side light-diffusing layer 91, and the surface-side light-diffusing layer 92) is formed on the entire surface 41 or the entire back 42 of the second polarized-light separating member 4. In this embodiment, however, as shown in FIGS. 14 and 15, a surface-side coloring layer 72 is formed only in a predetermined area on the surface 41 of the second polarized-light separating member 4. Incidentally, a back-side coloring layer 71 is formed on the entire back 42 of the second polarized-light separating member 4.

In the thus constructed display device, a second hue is imparted by the surface-side coloring layer 72 to light transmitted by an area where the surface-side coloring layer 72 is formed, regardless of whether the light is transmitted by an area of the transmitted light polarization axis changing device 3 for changing a transmitted light polarization axis or by an area for not changing the transmitted light polarization axis. If the surface-side coloring layer 72 is drawn as a pattern or a mark on the surface 41 of the second polarized-light separating member 4, the pattern or the mark can be superimposed on the display formed by the first return light and the second return light with the color imparted by the surface-side coloring layer 72.

That is, in the examples shown in FIGS. 14 and 15, color is merely imparted by the back-side coloring layer 71 to the light transmitted by an area in a non-applied voltage (OFF) area (background) where the surface-side coloring layer 72 is not formed. However, a hue is imparted by both of the surface-side coloring layer 72 and the back-side coloring layer 71 to the light transmitted by an area where the surface-side coloring layer 72 is formed. In addition, since a hue is not imparted to the light reflected on the surface 41 of the second polarized-light separating member 4 in an area in a voltage applied (ON) area (segment) where the surface-side coloring layer 72 is not formed, the light is achromatic. However, a second hue is imparted by the surface-side coloring layer 72 to the light reflected by the surface 41 of the second polarized-light separating member 4 in an area where the surface-side coloring layer 72 is formed. Therefore, as shown in FIG. 14, the time is displayed by the segments, and the area where the surface-side coloring layer 72 is formed is displayed in such a manner that comes to the surface as a pattern or a mark so as to cross over the segments and the background.

While the combined form of the surface-side coloring layer 72 and the back-side coloring layer 71 is described in this embodiment, instead of the surface-side coloring layer 72 and the back-side coloring layer 71, a form in which the surface-side light-diffusing layer 92 and the back-side light-diffusing layer 91 are formed on the second polarized-light separating member, or a combined form of the surface-side coloring layer 72 and the back-side coloring layer 71, and the surface-side light-diffusing layer 92 and the back-side light-diffusing layer 91 can offer basic and similar effects.

[Eighth Embodiment]

Figure 16:
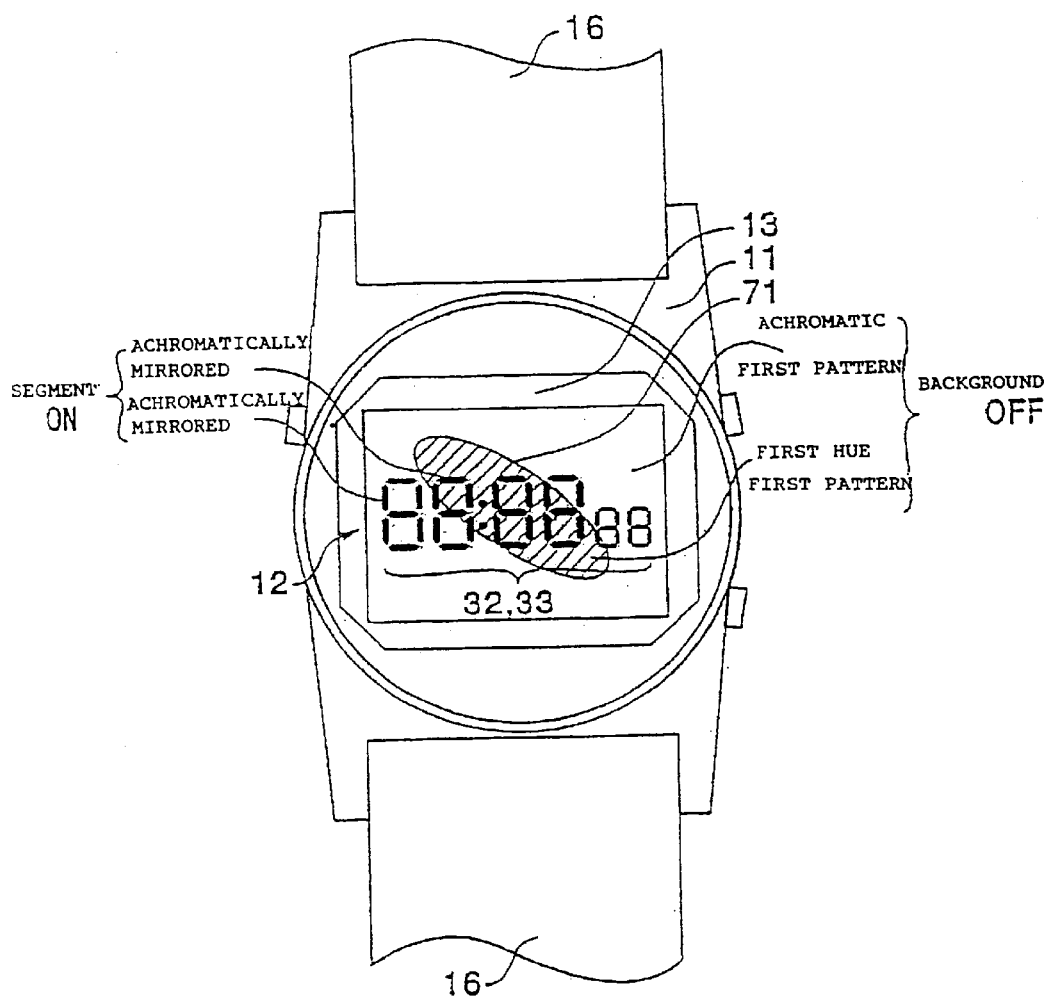
FIG. 16 is an explanatory view showing a state of a display device according to an eighth embodiment of the present invention.
Figure 17:
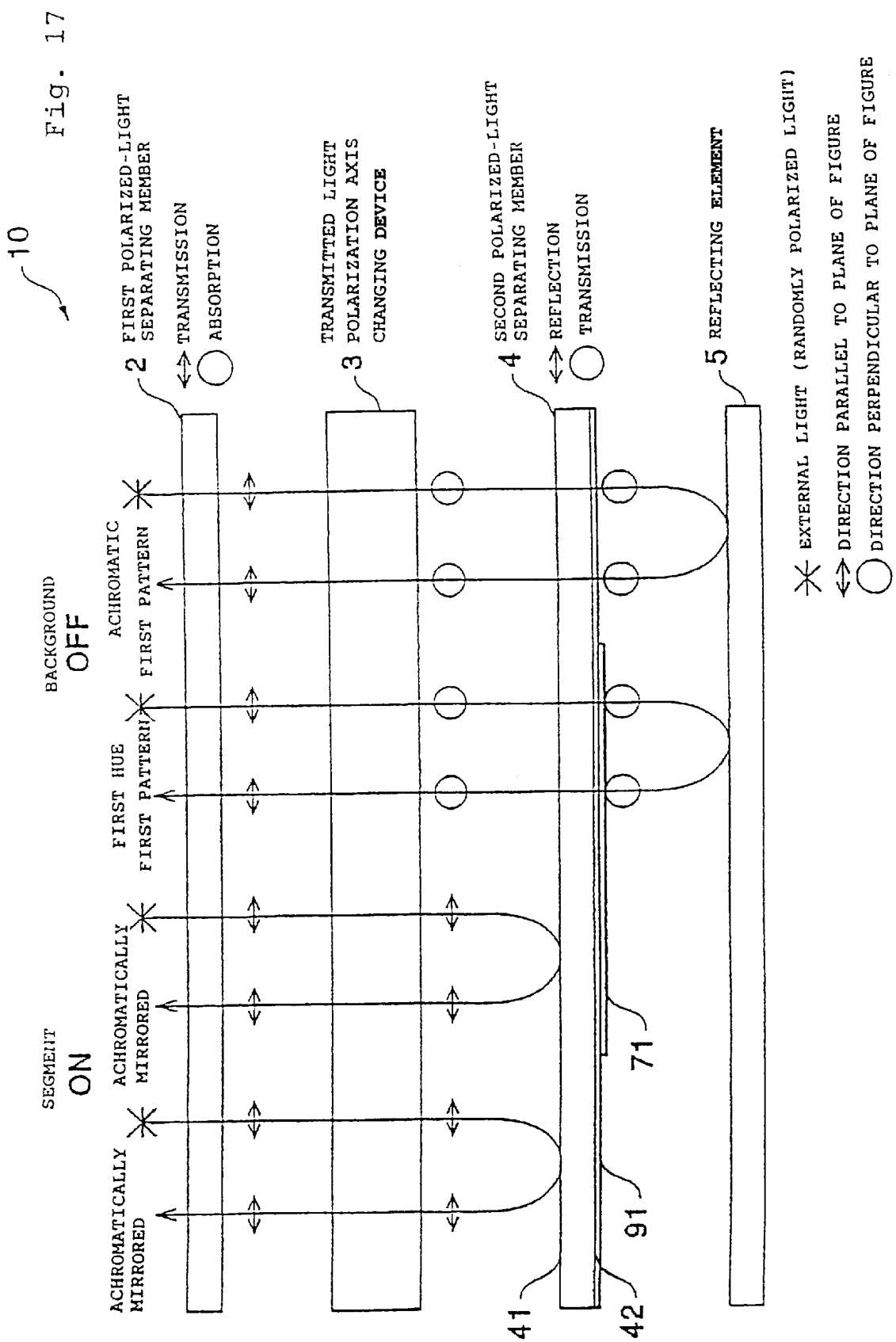
FIG. 17 is a schematic structural view of the display device according to the eighth embodiment of the present invention.

FIG. 16 and FIG. 17 are a plan view and a schematic structural view, respectively, showing a display form of a display device according to an eighth embodiment of the present invention.

Basically, this embodiment is, as shown in FIGS. 16 and 17, similar to the seventh embodiment in which a modified layer is formed only in a predetermined area of the second polarized-light separating member 4. That is, a back-side light-diffusing layer 91 is formed on the entire back 41 of the second polarized-light separating member 4, and a back-side coloring layer 71 is partially formed on the back-side light-diffusing layer 91.

In the thus-constructed display device 10, the display is produced in an achromatic mirror form in a applied voltage (ON) area (segment). That is, a hue is not imparted to light reflected by either of an area of a surface 41 of the polarized-light separating member 4 where the back-side coloring layer 71 is formed and an area where the layer is not formed. In contrast, in a non-applied voltage (OFF) area (background), while a first pattern, such as an orange peel, is merely imparted by the back-side light-diffusing layer 91 to the light transmitted by the area where the back-side coloring layer 71 is not formed, the first pattern, such as an orange peel, is imparted by the back-side light-diffusing layer 91, and a first hue is imparted by the back-side coloring layer 71 to the light transmitted by the area where the back-side coloring layer 71 is formed. Therefore, as shown in FIG. 16, the time is displayed by the segments, and the area where the back-side coloring layer 71 is formed is displayed as a pattern or a mark in such a manner that it comes to the surface.

While the back-side coloring layer 71 is formed in the predetermined area and the back-side light-diffusing layer 91 is formed on the entire back in this embodiment, the basic and similar effects can be obtained even if they are substituted. Industrial Applicability As described above, in the display device and the electronic timepiece according to the present invention, both the linearly polarized light component (first return light) reflected by the reflecting means to be transmitted by the second polarized-light separating member, the transmitted light polarization axis changing device, and the first polarized-light separating member, and the linearly polarized light component (second return light) transmitted by the second polarized-light separating member to be transmitted by the transmitted light polarization axis changing device and the first polarized-light separating member contribute to display. Accordingly, for example, in the electronic timepiece or the like, since both the background portion and the segment portion can be brightly displayed with good contrast, visibility is good. In addition, since the modified layer for emitting incident light by changing optical characteristics is formed on the surface or the back of the second polarized-light separating member, the modified layer imparts a hue or diffusibility to one or both of the first and second return light. Therefore, various combinations of texture and color can be realized, such that areas displayed by the first and second return light, for example, both the background portion and the segment portion of the electronic timepiece, can be colored, and highly versatile combinations of display forms are possible. For this reason, a display form that is able to appeal to the human esthetic sensibilities can be produced. Moreover, since the modified layer is formed on the second polarized-light separating member, neither the number of parts nor the thickness of the display device is increased.

What is claimed is:

1. A display device, comprising:
    a first polarized-light separating member that transmits a linearly polarized light component polarized in a first direction of incident light and that does not transmit a linearly polarized light component polarized perpendicularly thereto;
    a transmitted light polarization axis changing device that selects one of a first state of changing a transmitted light polarization axis and a second state of not changing the transmitted light polarization axis when incident linearly polarized light component is transmitted;
    a second polarized-light separating member that transmits a linearly polarized light component polarized in a second direction of incident linearly polarized light components and that reflects a linearly polarized light component polarized in a third direction perpendicular to the second direction;
    a reflecting element that reflects the linearly polarized light component transmitted by the second polarized-light separating member toward the second polarized-light separating member, the display device displaying predetermined information by first return light reflected by the reflecting element to be transmitted by the second polarized-light separating member, the transmitted light polarization axis changing device, and the first polarized-light separating member, and second return light reflected by the second polarized-light separating member to be transmitted by the transmitted light polarization axis changing device and the first polarized-light separating member of light incident on the first polarized-light separating member from an opposite side of the transmitted light polarization axis changing device; and
    a modified layer that emits light incident on the second polarized-light separating member by changing optical characteristics formed on at least one of a surface of the second polarized-light separating member facing the transmitted light polarization axis changing device and a back of the second polarized-light separating member facing the reflecting element.

2. The display device according to claim 1, the modified layer being a surface-side modified layer formed on the surface of the second polarized-light separating member.

3. The display device according to claim 1, the modified layer being a back-side modified layer formed on the back of the second polarized-light separating member.

4. The display device according to claim 2, the modified layer comprising at least a coloring layer that emits light incident on the second polarized-light separating member by changing a hue.

5. The display device according to claim 2, the modified layer comprising at least a light-diffusing layer that defines and emits light incident on the second polarized-light separating member.

6. The display device according to claim 2, the modified layer being a composite layer comprising a coloring layer that emits light incident on the second polarized-light separating member by changing a hue and a light-diffusing layer that diffuses and emits light incident on the second polarized-light separating member.

7. The display device according to claim 1, the modified layer being formed as a surface-side modified layer and as a back-side modified layer on both the surface and the back of the second polarized-light separating member, and the surface-side modified layer and the back-side modified layer mutually emitting light incident on the second polarized-light separating member by changing optical characteristics into different types.

8. The display device according to claim 7, each of the surface-side modified layer and the back-side modified layer comprising at least a surface-side coloring layer and a back-side coloring layer that emit light incident on the second polarized-light separating member by changing a hue into hues which differ from each other.

9. The display device according to claim 7, each of the surface-side modified layer and the back-side modified layer comprising at least a surface-side light-diffusing layer and a back-side light-diffusing layer that emit light incident on the second polarized-light separating member by changing the light into diffusion patterns which differ from each other.

10. The display device according to claim 7, at least one of the surface-side modified layer and the back-side modified layer being a composite layer comprising a coloring layer that emits light incident on the second polarized-light separating member by changing a hue, and a light-diffusing layer that diffuses and emits light incident on the second polarized-light separating member.

11. The display device according to claim 2, the surface-side modified layer being formed on an entire surface of the second polarized-light separating member.

12. The display device according to claim 2, the surface-side modified layer being formed only on a predetermined area on the surface of the second polarized-light separating member.

13. The display device according to claim 3, the back-side modified layer being formed on an entire back of the second polarized-light separating member.

14. The display device according to claim 3, the back-side modified layer being formed on a predetermined area in the back of the second polarized-light separating member.

15. The display according to claim 1, the reflecting element being a partial reflection optical element that reflects a part of an incident linearly polarized light component and that transmits other light, and the display device comprising a light source for backlight that emits light toward the reflecting element disposed between the second polarized-light separating member and the reflecting element at a position for sandwiching the reflecting element, and the display device displaying predetermined information using a linearly polarized light component emitted from the light source for backlight and transmitted by the second polarized-light separating member, the transmitted light polarization axis changing device, and the first polarized-light separating member.

16. The display device according to claim 4, the coloring layer being one of a color filter layer and a dyeing layer attached to the second polarized-light separating member.

17. The display device according to claim 6, the light-diffusing layer being one of a corrugation formed on the second polarized-light separating member and a light-scattering coating film attached to the second polarized beam separation member.

18. The display device according to claim 1, said transmitted light polarization axis changing device comprising a liquid crystal device.

19. An electronic timepiece comprising the display device defined in claim 1, time and measurement results of time being displayed by an area in the transmitted light polarization axis changing device selected in a state of transmitting by changing the transmitted light polarization axis of the linearly polarized light transmitted by the first polarized-light separating member and by an area selected in a state of transmitting with no change.

* * * * *

UNITED STATES PATENT AND TRADEMARK OFFICE
CERTIFICATE OF CORRECTION

PATENT NO. : 6,385,139 B1 Page 1 of 1
DATED : May 7, 2002
INVENTOR(S) : Yasuo Arikawa et al.

It is certified that error appears in the above-identified patent and that said Letters Patent is hereby corrected as shown below:

<u>Title page,</u>
Insert item:
-- [30]  Foreign Application Priority Data
January 13, 1999  [JP]   Japan ………………. 11-006541 --

Signed and Sealed this

Second Day of March, 2004

JON W. DUDAS
*Acting Director of the United States Patent and Trademark Office*